United States Patent [19]

Callahan et al.

[11] Patent Number: 4,823,069

[45] Date of Patent: * Apr. 18, 1989

[54] LIGHT DIMMER FOR DISTRIBUTED USE EMPLOYING INDUCTORLESS CONTROLLED TRANSITION PHASE CONTROL POWER STAGE

[76] Inventors: Michael Callahan, 201 W. 85th, New York, N.Y. 10024; John K. Chester, 331A Warren St., Brooklyn, N.Y. 11201; Robert M. Goddard, 330 First Ave., New York, N.Y. 10009

[*] Notice: The portion of the term of this patent subsequent to Dec. 30, 2003 has been disclaimed.

[21] Appl. No.: 943,381

[22] Filed: Dec. 17, 1986

Related U.S. Application Data

[63] Continuation-in-part of Ser. No. 640,978, Aug. 15, 1984, Pat. No. 4,633,161.

[51] Int. Cl.$^4$ .............................................. G05F 1/40
[52] U.S. Cl. .................................... 323/235; 323/242; 315/194; 307/647
[58] Field of Search ............... 323/237, 239, 242, 267, 323/268, 271; 315/195, 199, 294, 295, 312, 317; 307/252 UA

[56] References Cited

U.S. PATENT DOCUMENTS

| | | | |
|---|---|---|---|
| 3,142,781 | 7/1964 | Izenour | 315/194 |
| 3,243,653 | 3/1966 | Locklin | 315/194 |
| 3,256,463 | 2/1966 | Davis | 315/158 |
| 3,274,484 | 9/1966 | Gebhardt et al. | 323/93 |
| 3,667,030 | 5/1972 | Gordon et al. | 323/24 |
| 3,706,913 | 12/1972 | Malatchi | 323/237 X |
| 3,733,528 | 5/1973 | Gilbreath | 323/242 X |
| 3,845,351 | 10/1974 | von Ballmoos et al. | 315/293 |
| 3,879,652 | 4/1975 | Billings | 307/252 UA X |
| 3,990,000 | 11/1976 | Digneffe | 323/325 X |
| 4,057,751 | 11/1977 | Bonsignore et al. | 315/294 X |
| 4,080,548 | 3/1978 | Johnson | 315/68 |
| 4,086,526 | 4/1978 | Grüdelbach | 323/34 |
| 4,325,021 | 4/1982 | McMackin | 323/351 |
| 4,423,478 | 12/1983 | Bullock et al. | 363/89 |
| 4,447,765 | 5/1984 | Cote | 315/240 |
| 4,450,384 | 5/1984 | Krokaugger | 315/327 |
| 4,504,779 | 3/1985 | Haman | 323/349 |
| 4,528,494 | 7/1985 | Bloomer | 323/237 |
| 4,540,893 | 9/1985 | Bloomer | 307/255 X |
| 4,547,828 | 10/1985 | Bloomer | 361/86 |
| 4,567,425 | 1/1986 | Bloomer | 323/237 |
| 4,617,508 | 10/1986 | Bloomer | 323/237 |
| 4,633,161 | 12/1986 | Callahan et al. | 323/242 |
| 4,688,154 | 8/1987 | Nilssen | 362/147 |
| 4,688,161 | 8/1987 | Covington | 363/37 |

FOREIGN PATENT DOCUMENTS 56-148172 11/1981 Japan .

OTHER PUBLICATIONS

Unitrol Dimming System Brochure, Union Connector Co., Inc., "Skirpan Design Fills TV Gap", Reprint *TV Technology*, Aug. 1984, VL3 Wash Luminaire Data Sheet, Vari-Lite, Inc., Dallas, Tex.

(List continued on next page.)

*Primary Examiner*—William M. Shoop, Jr.
*Assistant Examiner*—Marc S. Hoff
*Attorney, Agent, or Firm*—Kenyon & Kenyon

[57] ABSTRACT

An improved dimming apparatus adapted for use in distribution dimming systems, in which dimmer enclosures each containing at least one semiconductor power controlling means are located in a plurality of spaced apart locations, each such enclosure located in proximity to at least one of its associated lamp loads. The disclosed dimming apparatus achieves unique advantages in the application through the use of a semiconductor power controlling means capable of modulating the instantaneous amplitude of the voltage or current supplied to the lamp load under the active control of its control input, a signal being applied to the control input of the power controlling means such that an output waveform is supplied to the lamp load in which at least one transition between a substantially off condition and a substantially on condition occurs during substantially each discrete half-cycle of the AC source and the duration of the transition is increased to suppress electromagnetic interference.

27 Claims, 11 Drawing Sheets

OTHER PUBLICATIONS

"Power Supply Aspects of Semiconductor Equipment", H. A. Gauper, Jr., J. D. Harden, Jr., A. M. McQuarrie, IEEE Spectrum (U.S.A.) vol. 8, No. 10, pp. 32–43 (Oct. 1971).

"Lamp Acoustic Noise and the Reverse Phase Control Dimmer", R. M. Burkhart, R. W. Burtness, IEEE Trans. Ind. Appl. (U.S.A.), vol. 1A-8, No. 1, pp. 84–88 (Jan.–Feb. 1972).

"Reverse Phase Control Dimmer for Incandescent Lighting", R. M. Burkhart, D. L. Ostrodka, IEEE Trans. Ind. Appl. (U.S.A.), vol. 1A-5, No. 5, pp. 579–583 (Sep.–Oct. 1979).

"Using VMOS for Direct and Reverse Phase Control", C. F. Christiansen, M. Benedetti, Rev. Telegr. Electron. (Argentina), vol. 69, No. 819, pp. 499–503 (Jun. 1981).

"Power FET Controlled Dimmer for Incandescent Lamps", C. F. Christiansen, M. Benedetti, IEEE Trans. Ind. Appl. (U.S.A.), vol. IA-19, No. 3, pt. 1, pp. 323–327 (May–Jun. 1983).

"Stage Lighting and the State of the Art in Twenty Years", J. E. Rubin, Lighting Dimensions, vol. VII, No. 1, Mar. 1983, pp. 52–60.

"Bright New World?, Tour System Design for the 1980s".

"Bright New World?, Part III", M. Callahan, Lighting Dimensions, vol. VII, No. 3, Jun. 1983, pp. 35–42.

"Dimming and Lighting Control . . . State of What Art?", J. M. Good, III, International Technical Conference, Theatre, Television, and Film Lighting, Committee of Illuminating Engineering Society, 5 Oct. 1987, Montreal, Quebec, Canada.

Theatre Crafts, vol. 20, No. 8, 8 Oct. 1986, p. 14, Model 96-2400 High Density Dimmer Rack Data Sheet, 83-V-6.

Production Arts Lighting, Inc., New York, N.Y., Unitrol Data Sheet, Union Connector Co., Inc., Roosevelt, N.Y.

"Product Report-Union Connector's SU-1/DIG-1", Theater Crafts, May 1984.

QD TM Series Dimmer Brochure, Electro Controls, Salt Lake City, Utah.

Lightboard XP DC90 Dimmer Brochure, Strand Lighting, Rancho Dominguez, Calif.

"Dimming Controls Provide Stage Production Sparkle", M. O'Neal, Contractor's Electrical Engineering.

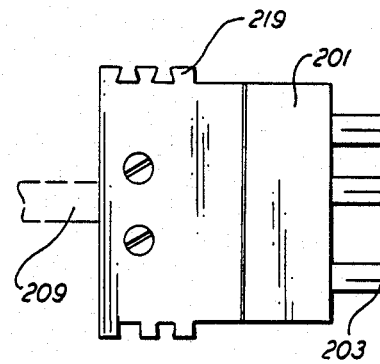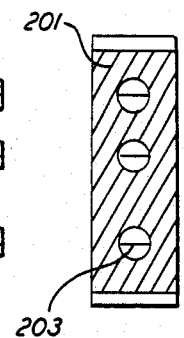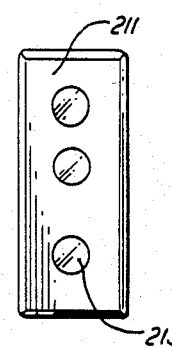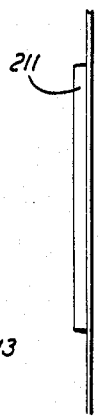
FIG. 5A    FIG. 5B    FIG. 5C    FIG. 5D
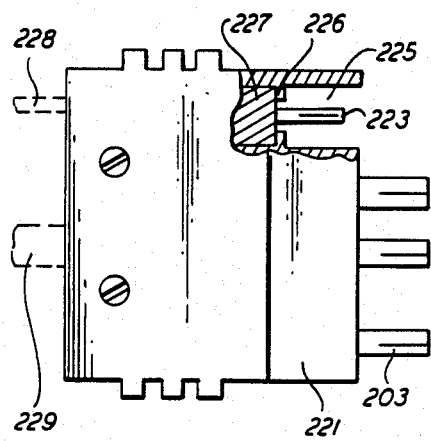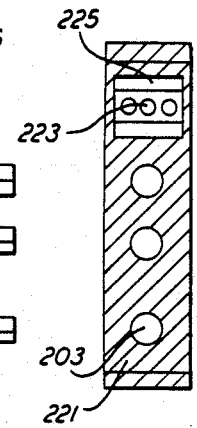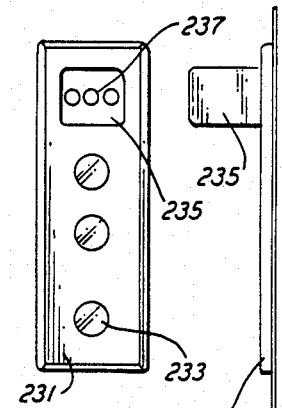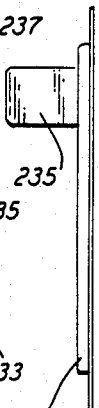
FIG. 5E    FIG. 5F    FIG. 5G    FIG. 5H
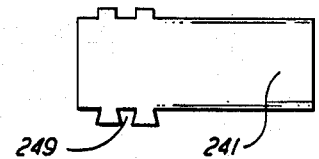
FIG. 5I

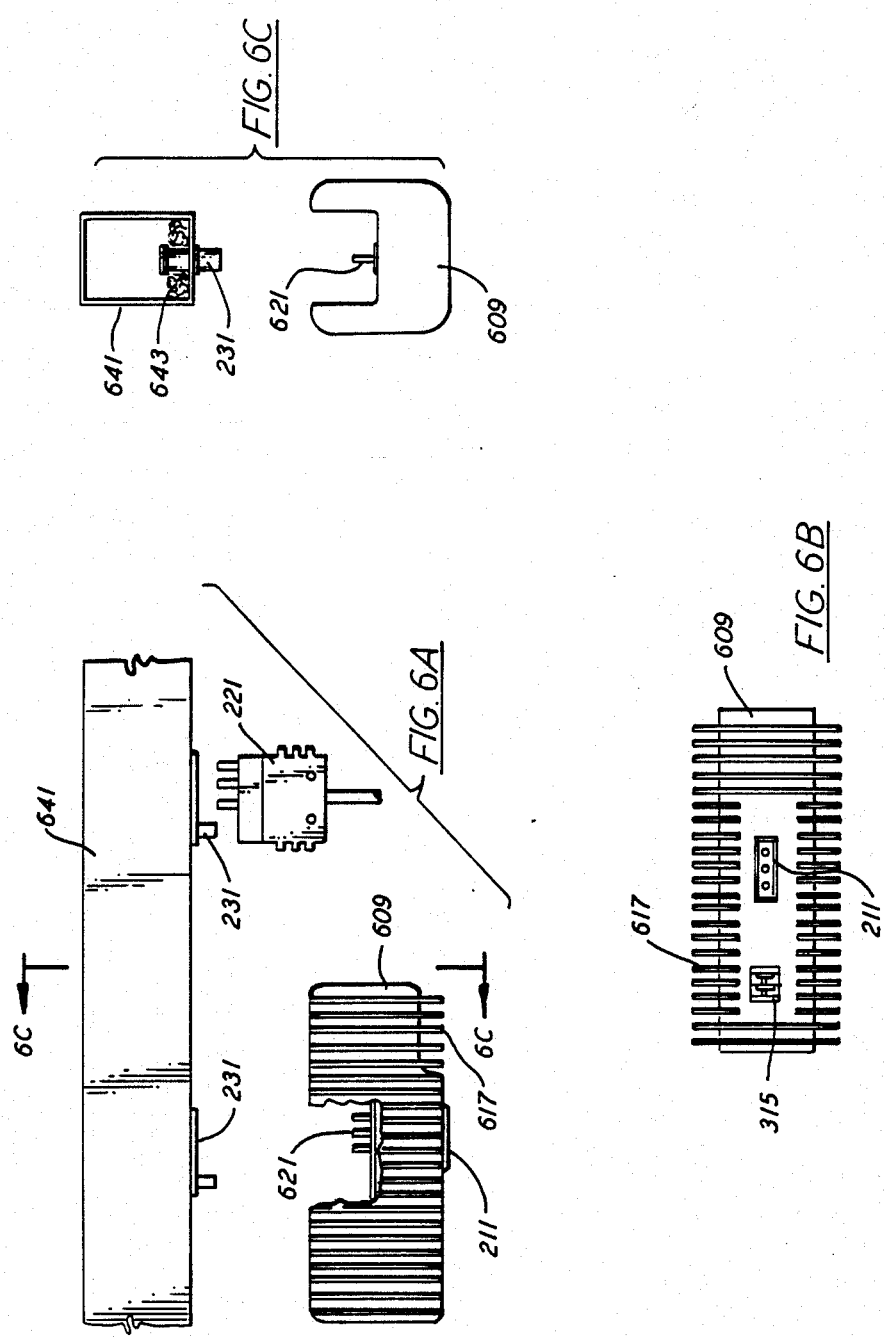

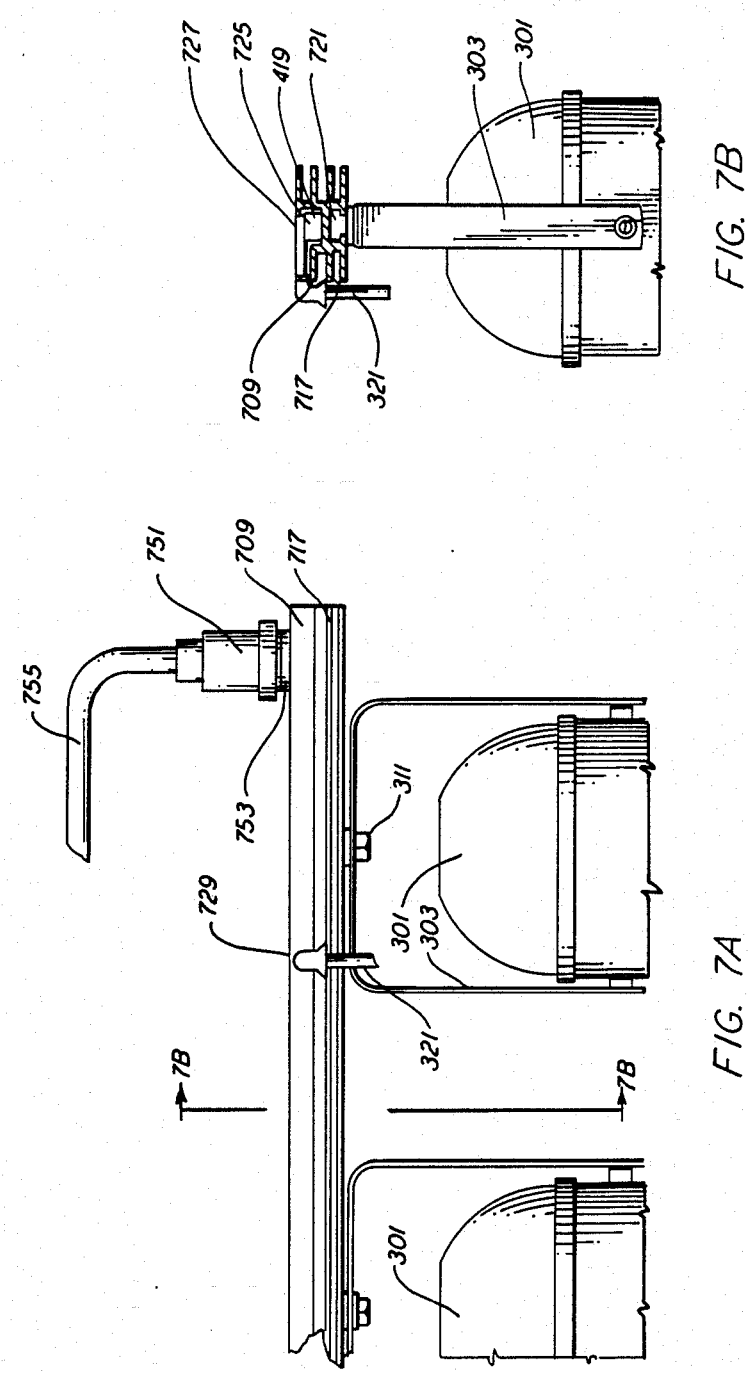

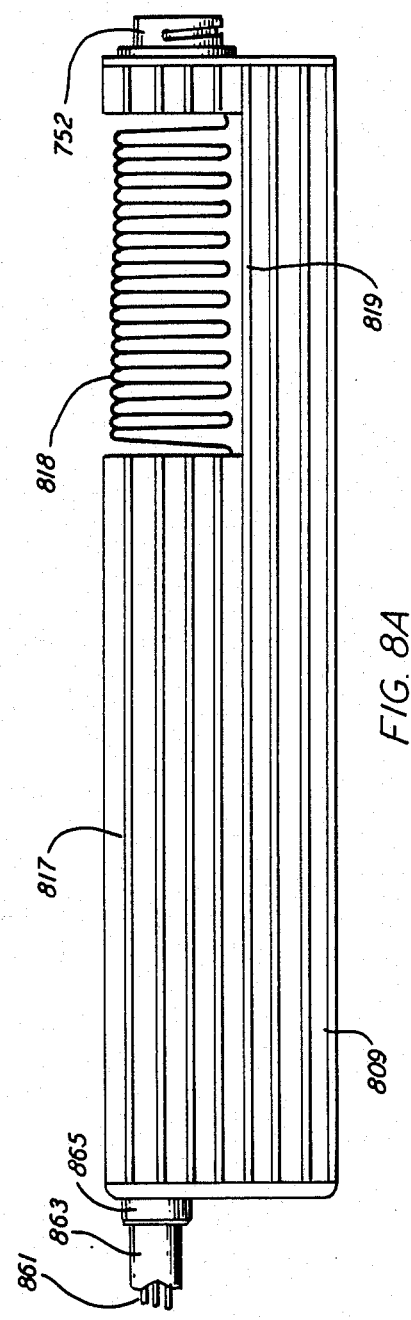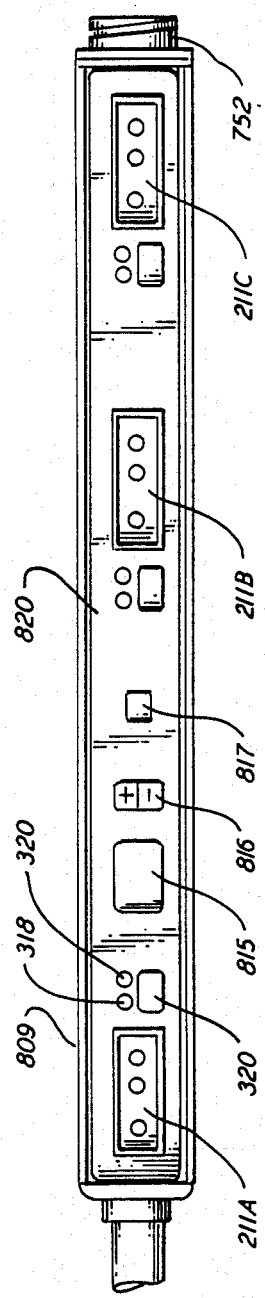
FIG. 8A
FIG. 8B

LIGHT DIMMER FOR DISTRIBUTED USE EMPLOYING INDUCTORLESS CONTROLLED TRANSITION PHASE CONTROL POWER STAGE

This application relates to lighting control, and more specifically to an improved light dimming apparatus designed to be distributed in proximity to the controlled fixtures. It represents a continuation-in-part of application 640,978, filed Aug. 15, 1984, now U.S. Pat. No. 4,683,161 which is included in its entirety by reference.

The production of stage shows, concerts, and television broadcasts is a major industry. These entertainment products demand dramatic and effective lighting, and with it, the control of fixture intensity, which has long been afforded by varying the average power supplied to the lamp using thyristor-based phase control dimmers as described in U.S. Pat. No. 3,397,344.

Lighting such productions also requires distributing the fixtures to a variety of spaced-apart locations in a theater, studio, or auditorium.

In permanent installations, fixtures may be used at fixed and moveable positions over and on either side of the stage; at stage level; and at various positions in the auditorium including the ceiling, the balcony fronts, and along the side walls. Enough electrical outlets must be provided at each of these positions to accommodate the maximum number and wattage of fixtures which a given production might wish to use. This requires the construction of semi-custom electrical connector strips and outlet boxes which provide connectors of the appropriate type and number; their mounting at the fixture positions; and their connection to a centralized dimmer bank using large numbers of discrete conductor pairs encased in wireways or conduit.

While no one production will connect fixtures to every outlet at every position, a permanent facility must provide dimming capability at every one. There are two methods of achieving this object.

One method is to install a number of higher wattage dimmers at least equal to the largest anticipated requirement for any single production (although less than the total wattage of all installed outlets/circuits), and to provide a means to selectively connect or "load-patch" to the appropriate dimmers only those outlets/circuits actually required. Such patch panels are large; expensive both to build and install; and complicate the operation of the system. This method has therefore fallen into disuse.

The presently preferred method, "dimmer per circuit", installs a number of dimmers equal to the number of circuits; permanently connects each circuit to an associated dimmer; and performs all "patching" at the low-voltage control signal level. This method has the benefit of eliminating the requirement for a load patch panel, but has the disadvantage of requiring very large numbers of dimmers. This presents interrelated mechanical and thermal problems, as reducing both the size and the cost of the dimmer banks requires limiting the size of the dimmer rack, which is at odds with the requirement of dissipating the thermal losses of thyristors and chokes. As a result, high-volume forced air cooling of the racks is employed, with the audible noise which results. The audible noise of both the dimmer chokes and of the cooling fans requires isolating the racks, frequently in a room distant from the point of use, increasing the total installed cost of the lighting system.

Both methods are most inefficient in television studios where many hundreds of outlets may be installed although only a fraction may be in use at any one time.

For temporary installations, portable cables are used to connect the lighting fixtures with the dimmers. Traditionally, two- and three-conductor rubber jacketed cables have been employed, one cable for each circuit (and frequently for each fixture). Groups of six to twelve cables are taped together in "bundles" to simplify handling. This approach has the benefit of economy and flexibility as the number of cables and their lengths and connector spacings can be altered to suit, but it has the disadvantage of producing very large and heavy bundles which are time-consuming to prepare and to handle. As a result, professional touring systems have increasingly employed cables having eighteen to thirty-seven conductors, allowing a single cable of moderate size to carry six to twelve circuits, the cables frequently terminated with multi-pole connectors to further reduce system setup time, but such "multi-cables" produce a dramatic increase in the capital cost of the lighting system.

Further, when the temporary lighting installation provides the supporting structure from which the fixtures hang (such as a "truss"), the limitations on the number of fixtures which can be accommodated by the structure itself tend to stabilize the number of fixtures employed, allowing the design of a multi-cable system whose circuits are fully utilized by most productions. By contrast, in more theatrical applications where the number of fixtures per position and their spacing varies markedly from production to production and within a production itself, only a portion of the circuits in a multi-cable may be employed, representing wasted capital and setup labor.

It has long been apparent that many advantages would follow if the dimmers themselves could be distributed in proximity to the fixtures they control. In permanent installations, no elaborate system of discrete conductor pairs need be installed between the lighting positions and a dimmer room, indeed the dimmer room itself would no longer be required. In temporary installations, the number of conductors between the lighting position and the centralized portions of the system could be dramatically reduced, and with it the size and cost of the cabling system.

Many methods of achieving this object have been proposed: mounting a dimmer within the fixture housing or on the fixture yoke; to the mounting position; in small groups in a common enclosure at the mounting position with jumpers to the fixtures; in the distribution raceway; or in a distribution raceway which also serves as the mounting position. Yet, despite the long-felt need for distributed dimming, none of these methods has come into significant professional use, in no small measure due to relevant disadvantages of the thryistor-based phase control dimmer.

In such dimmers, the thyristor turns on in approximately one microsecond, producing a step voltage transition equal to the instantaneous line voltage. This voltage step produces a large current step in the attached load. The combined effect is a burst of electromagnetic energy rich in harmonics from audio frequencies all the way into the commercial radio frequencies. Both high and low frequency components of the EMI noise spectrum propagate through the power wiring, while the high frequency components also radiate from the conductors themselves. The resulting electromagnetic interference has a variety of undesirable effects on other electronic equipment, notably sound amplification, radio, and video equipment, the precise nature and severity of those effects determined by a complex mix of variables.

This pulse also produces a magnetostrictive contraction of the connected lamp filament inducing vibration which causes audible noise and decreases lamp life.

For this reason, the power stages of prior art electronic dimmers incorporate a magnetic inductor or "choke" to reduce the rate of current change, increasing the voltage rise time. Increasing rise time decreases both the total EMI power generated and attenuates the higher frequencies.

For any given choke design it is axiomatic that the longer the rise time and the better the EMI suppression the larger and heavier (and hence more expensive) the choke.

However, as a choke controls only the rate of current change, the voltage rise and hence noise spectrum is highly load dependent.

Further, as the choke does not affect the rate of thyristor turn on, there is still a step voltage transition present in the conductor between the thyristor and choke. Although this transition does not reach the load, it results in radiated interference, particularly if the choke has been mounted remotely from the thyristor to ease mechanical design problems.

Finally, an ideal choke would provide increasing attenuation with frequency. However, the chokes employed in most prior art dimmer designs have, due to cost considerations, had fairly high shunt capacitance and/or types of core materials which result in significantly less than ideal high frequency attenuation.

In sum, because the addition of a choke to prior art dimmer power stages has no effect on the step voltage transition of the power device, an EMI noise spectrum far greater than that predicted from the circuit's rise time will result.

In a professional dimmer, the weight of the choke may exceed that of all the electronic components combined. Choke weight is therefore a significant impediment to the distributed dimmer due to the undesirable increase in weight at the fixture position. This weight also requires substantial mounting provisions, increasing both the cost and complexity of the dimmer's mechanical design.

The choke also represents the largest single component in a professional dimmer, and, in distributed dimmer applications, dramatically increases the size of the enclosure, with a variety of practical disadvantages, including obstructing access to the fixture and/or the full horizontal or vertical travel of a standard fixture on normal mounting centers; and/or incompatibility with existing support structures and shipping cases.

Chokes waste electrical energy in the form of heat as a result of both $I^2R$ and core losses. This heat generation restricts the density of dimmer packaging; affects associated wiring and components; and requires airflow for cooling. However, unlike semiconductor packages, the efficiency of choke heat transfer to the ambient cannot be significantly improved with techniques like heatsinking in order to increase packaging density and/or reduce operating temperatures. Choke heat loss therefore complicates the design of a distributed dimmer, particularly given the elevated ambient temperatures which may be found in proximity to the fixtures and the inability to use forced-air cooling for reasons of both cost and audible noise.

Chokes also frequently suffer from magnetically-induced vibration at certain phase angles, which, without careful isolation, produces audible noise which can distract the audience or be detected by sound recording equipment. This isolation, of course, is often at odds with the requirement for proper cooling.

Certain choke designs can also generate strong magnetic fields which have undesirable effects on nearby electronic equipment.

Thyristor-based phase control dimmers also suffer from other disadvantages in dimmer-at-lamp applications.

The specialized bulbs employed in performance lighting fixtures do not incorporate internal fusing and, on failure, can draw hundreds of amperes through the dimmer. Similarly, shorts in fixtures, wiring, or connectors can draw equally large amounts of current through the dimmer before a supply circuit breaker can open. The semiconductors employed in any professional electronic dimmer must be inherently capable of withstanding such inrush currents or be provided with the additional means to do so.

In prior art large wattage dimmers (i.e. 6000–12000 watts) the continuous currents involved require the use of thyristors whose ability to withstand inrush currents ($I^2t$ rating) exceeds the typical fault currents encountered. However, the SCRs or Triacs required by the modest continuous currents involved in distributed dimming possess $I^2t$ ratings far lower than typical fault currents (which are determined not by the wattage of the dimmer itself but by the fault current available to the dimmer from the building service as limited by the impedance presented by the supply cables. The survivability of the dimmer's semiconductors is also affected by the quality of its choke insofar as the greater the rise time, the longer the period is available for circuit protective devices to act.) Devices with adequate $I^2t$ can be obtained, but at a cost premium which produces an unacceptable increase in the cost of 1000 watt dimmers and an undesirable one in the case of 2000 watt units. As a result, certain modern "professional" dimmers employ semiconductors which will not survive the fault currents available in some installations. Other dimmers in the 1000 watt range employ the combination of devices with a moderate withstand rating and a high-speed silver-sand fuse to increase the probability of survival. The requirement for a fuse, fuseholder, and circuit breaker with their associated mounting and wiring adds to both the parts and labor cost of dimmer assembly; to the front panel area requirements of each dimmer; and means the nuisance and expense of fuse replacement for the user—all particular disadvantages in the case of distributed dimming which places a premium on minimizing the size, weight, and cost of the dimmer as well as the number of service points which may require access to the fixture.

Considerable attention has been pa-id to the prospects for an improved dimmer power stage requiring no choke or a choke of minimal size.

One such approach requiring no inductor is the "skipped half-cycle" dimmer as described in U.S. Pats. Nos. 3,691,404 and 4,287,468. However, at a line frequency of 60 cycles, it provides insufficient resolution for professional lighting use and can produce flickering of the bulb.

A second approach to the "chokeless" dimmer is the use of high wattage power transistors operating in a pure linear mode. However, as much as 25% of the load wattage must be dissipated by the devices at some settings—versus 3–5% in prior art phase control designs (only part of which is dissipated in the devices themselves). Either massive heat sinks or some exotic form of cooling would be required. Neither alternative is acceptable in distributed dimmer applications.

A third approach is the pulse width modulated or "switched mode" dimmer. Although such a switched mode dimmer still requires an inductor it exploits the principle that the higher the operating frequency, the smaller the inductor. Such dimmers have proven too complex and expensive to be practical for general use, as well as presenting the prospect of RFI.

A fourth approach is the capacitively-ramped reverse phase control dimmer, which simply succeeds in trading the bulk of a choke for that of a capacitor, and whose EMI product is highly load-dependent.

Meeting the long-felt need for a practical distributed dimming system therefore requires a dimmer which provides EMI and audible lamp noise suppression at least equal to current professional standards; allows minimizing size and weight; is free of radiated audible noise and strong magnetic fields; and preferably provides device protection without a fuse.

SUMMARY OF THE INVENTION

The operation of the improved dimmer of the present invention may be better understood by reference to FIG. 1A, a block diagram.

Like prior art phase-control dimmer power stages, the power stage employed by the improved dimmers of the present invention employs a semiconductor power controller means 419 series-connected between an input 401 from the AC mains supply and an inductive load 499.

Unlike most prior art dimmers, the power stage of the present invention employs semiconductor devices capable of modulating the voltage or current supplied to load 499 under the active control of their gate voltage or current.

The employment of such devices per se is neither novel nor does it lead directly to significant benefits. The active gate control afforded by such devices does allow electronic current-limiting and FIG. 1A accordingly illustrates the combination of a current sensor 451, current limiting circuit 453, and clamp 455.

The power stage of the improved dimmers of the present invention achieves such benefits with the addition of a third element in combination with the power devices 419 and a traditional phase control drive circuit 404. This third element is illustrated as a transition control means 406 interposed between the output 403 of drive circuit 404 and the gate input 420 of devices 419.

When the output of drive circuit 404 turns on, it does so instantly. At the output of transition control means 406 it slews from off to on at a slower rate, established by the circuit's design as 300–700 microseconds. Accordingly, the output devices 419, which accept the output 408 of transition control means 406 as their gate input 420, do not turn on instantly, but slew from zero load voltage or current to full conduction over a period on the order of 300–700 microseconds. The power stage thus controls the transition between conduction and non-conduction to produce an output waveform similar to a properly filtered prior art phase control dimmer without the use of any passive inductor.

The use of such a power stage affords unique advantages in distributed dimming applications:

The elimination of the filter inductor, a prior art dimmer's largest single component, allows a radical reduction in dimmer volume, permitting the construction of distributed dimmer enclosures which are both smaller than any prior art unit meeting professional standards, and whose envelopes may be adapted to the application. Such improved dimmer enclosures obviate one important disadvantage of many prior art distributed dimmers; their obstruction of access to the fixture and/or the full horizontal or vertical travel of a standard fixture on normal mounting centers, as well as the difficulties of retrofitting them to present fixtures, fixture supports, and shipping cases. This reduction in volume also results in improved handling ease, and reduced shipping costs.

The elimination of the filter inductor, a prior art dimmer's heaviest single component, produces a drastic decrease in dimmer weight. The improved dimmer of the present invention therefore achieves the benefits of distributed dimming with a minimal increase in weight at the fixture position, as well as continuing benefits in reduced shipping costs.

Unlike prior art dimmer designs, this weight reduction comes at no increase in EMI product or audible lamp noise.

The elimination of the filter inductor also eliminates a source of $I^2R$ and core losses as a source of voltage drop at the fixture and of generated heat. While the improved dimmer of the present invention does produce heat, it is restricted to the power control devices themselves, whose transfer efficiency can be improved by known means, considerably simplifying the dimmer's thermal design.

The elimination of the filter inductor also eliminates the electronic dimmer's sole source of significant mechanical noise and strong magnetic fields, a key consideration in distributed dimmer applications due to the presense of the dimmer in the performing area.

The elimination of the filter inductor, one of a prior art dimmer's most expensive components, effects a significant economy in parts cost, which is accompanied by savings in the dimmer's mechanical costs which follow from the reduction in complexity, size and weight.

These benefits come without the offsetting disadvantages which have characterized previous alternatives to the phase control dimmer. The thermal losses of the power stage employed by the improved dimmer of the present invention are little greater than those of an equivalent phase control dimmer and, being concentrated in the devices, may be more readily dissipated. The power stage is simple both in design and operation and may be employed with any known phase control drive circuit with little or no modification. Further, its rise time is easily selectable or adjustable over a wide range to suit the requirements of the specific application.

However, in contradistinction to prior art thyristor-based designs, the power stage employed by the improved dimmer of the present invention controls rise time by directly controlling the turn-on rate of the devices themselves. No step voltage or current transition is produced, and hence the EMI noise spectrum of the dimmer is the ideal for a rise time of that duration.

Various embodiments of the improved dimmer of the present invention will be disclosed, illustrating the unique and substantial practical advantages of such a dimmer in distributed applications.

An improved connector system which allows the simultaneous connection of power and signal while maintaining compatibility with prior art power connectors will be disclosed.

DESCRIPTION OF THE DRAWINGS

FIG. 5A is a side elevation of a power connector.

FIG. 5B is a front elevation of the power connector of FIG. 5A.

FIG. 5C is a front elevation of a power receptacle.

FIG. 5D is a side elevation of the power receptacle of FIG. 5C.

FIG. 5E is a side elevation of a combined power and signal connector.

FIG. 5F is a front elevation of the combined power and signal connector of FIG. 5E.

FIG. 5G is a front elevation of a combined power and signal receptacle.

FIG. 5H is a side elevation of the combined power and signal receptacle of FIG. 5G.

FIG. 5I is a side elevation of a signal connector.

FIG. 6A is a side elevation of the improved dimmer of the present invention adapted for raceway use.

FIG. 6B is a reverse plan view of the improved dimmer of FIG. 6A.

FIG. 6C is a sectional view of FIG. 6A.

FIG. 7A is a side elevation of an embodiment of the improved dimmer of the present invention adapted for mounting within an enclosure which serves as the support for a plurality of fixtures.

FIG. 7B is a sectional view of FIG. 7A.

FIG. 8A is a plan view of an embodiment of the improved dimmer of the present invention adapted for general theatrical use.

FIG. 8B is a front elevation of the embodiment of FIG. 8A.

DETAILED DESCRIPTION

Figure 1A:
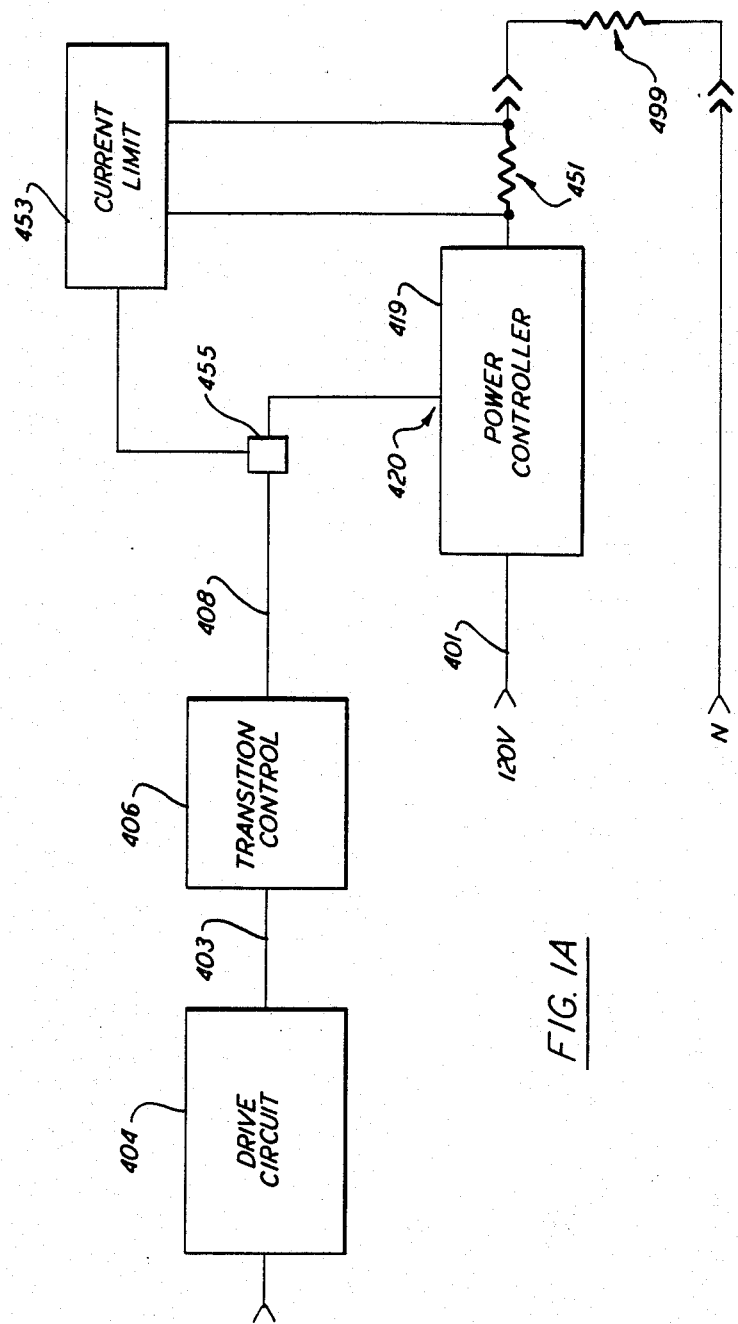
FIG. 1A is a block diagram of the improved dimmer of the present invention.
Figure 1B:
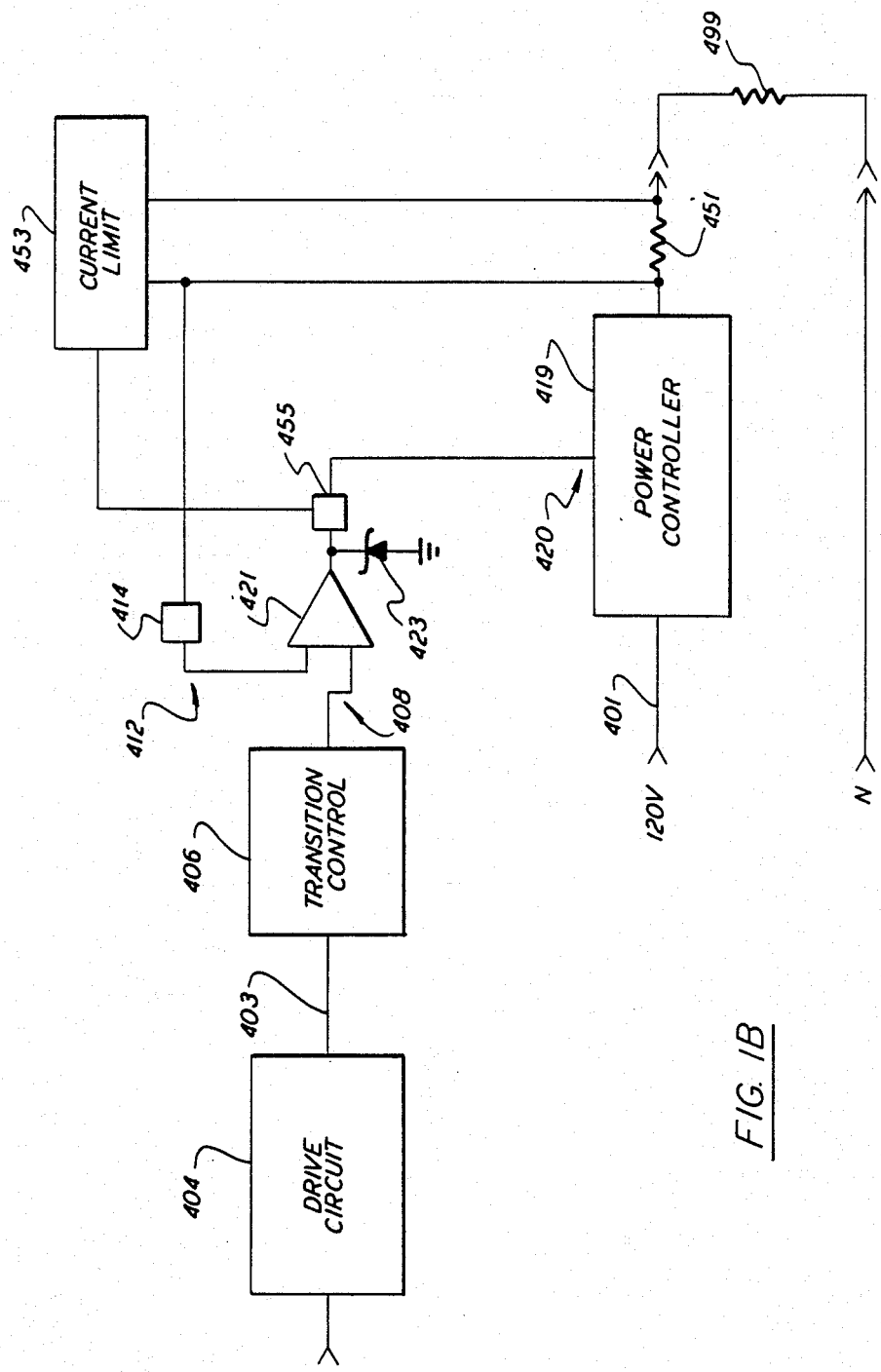
FIG. 1B is a block diagram of the improved dimmer of the present invention adapted for the use of power devices with an input voltage/output current relationship.

While a preferred embodiment for drive or triggering circuit 404 of FIGS. 1A and 1B will be disclosed, such a circuit may be analog open loop; or analog fed-back (as disclosed in U.S. Pat. No. 3,397,344); or digital (as disclosed in U.S. Pat. No. 4,241,295).

The means to control the transition, illustrated as transition control means 406, may comprise a separate hardware circuit, whether analog, digital, or a software function; or it may be partially or fully integrated into the triggering circuitry or the device drivers.

Similarly, the output devices, illustrated as power controller means 419, may be of any known type suitable for the purpose.

Such devices must satisfy certain basic requirements. Foremost is the ability to withstand the high instantaneous power dissipation which is characteristic of the power stage's operation, for while the thermal load is relatively modest if averaged across the half-cycle, it is concentrated in the transition period.

Given both suitable instantaneous and average power ratings, devices are then selected on the basis of drive characteristics, protection characteristics, and conduction losses. While field effect devices are presently preferred, it is understood that improvements to known devices and the evolution of new types may alter such preferences over time.

Refer now to FIG. 1B, a block diagram of the improved dimmer of the present invention adapted for the use of devices having an input voltage/output current relationship, such as field effect devices. Parts with the same function in FIG. 1A are identified with the same reference number.

The input voltage at the gate of a field effect device controls its output current. Therefore, for a given input voltage in the device's linear region, the actual voltage at load 499 is a factor of the impedance it presents which varies with the number of filaments connected and their temperature. This mechanism has no effect on the dimmer when off or in full conduction, but during the transition period it results in variations in the duration of the transition with variations in the load impedance—and as such, undesirable variations in average power, audible lamp noise, and thermal losses in the devices.

Although dimmers with overall feedback in the triggering circuit (such as disclosed in U.S. Pat. No. 3,397,344) compensate for the effect on average power, they do not correct for the variation in the duration of the transition, and with it, variations in audible noise and thermal losses.

Unlike both prior art dimmer power stages with passive rise time limitation and prior art controlled transition dimmers, the power stage of the present invention corrects this variation by controlling the rate at which voltage rises (or falls) during the transition. This object may be achieved by the use of a semiconductor power controlling means with an input voltage/output voltage relationship (such as a power transistor in an emitter-follower relationship). Where devices having an input voltage/output current relationship are employed, means for this correction is required, illustrated in FIG. 1B as a transition feedback circuit comprising differential amplifier 421 interposed between transition control means 406 and the gate input 420 of the power devices 419, accepting as its second input, the dimmer output voltage via conductor 412 and feedback network 414.

Feedback network 414 shapes, rectifies, or attenuates the load voltage derived from load 499, as may be required. Some embodiments, including that of FIG. 2A will provide two means analagous to amplifier 421 and network 414, one provided for each half-cycle. The actual output voltage produced by the interaction of the current resulting from a given gate input voltage with the impedance of load 499 is compared with the desired value, and the gate input voltage corrected accordingly. The power stage of the present invention is therefore capable of maintaining the same duration of transition at each phase angle and as such, consistent curve, audible noise, thermal losses and EMI suppression despite variations in load impedance.

The gate voltage/output current relationship of field effect devices also permits limiting output current by limiting maximum gate input voltage. Accordingly, FIG. 1B illustrates zener diode 423 as clamping maximum gate voltage.

Figure 2A:
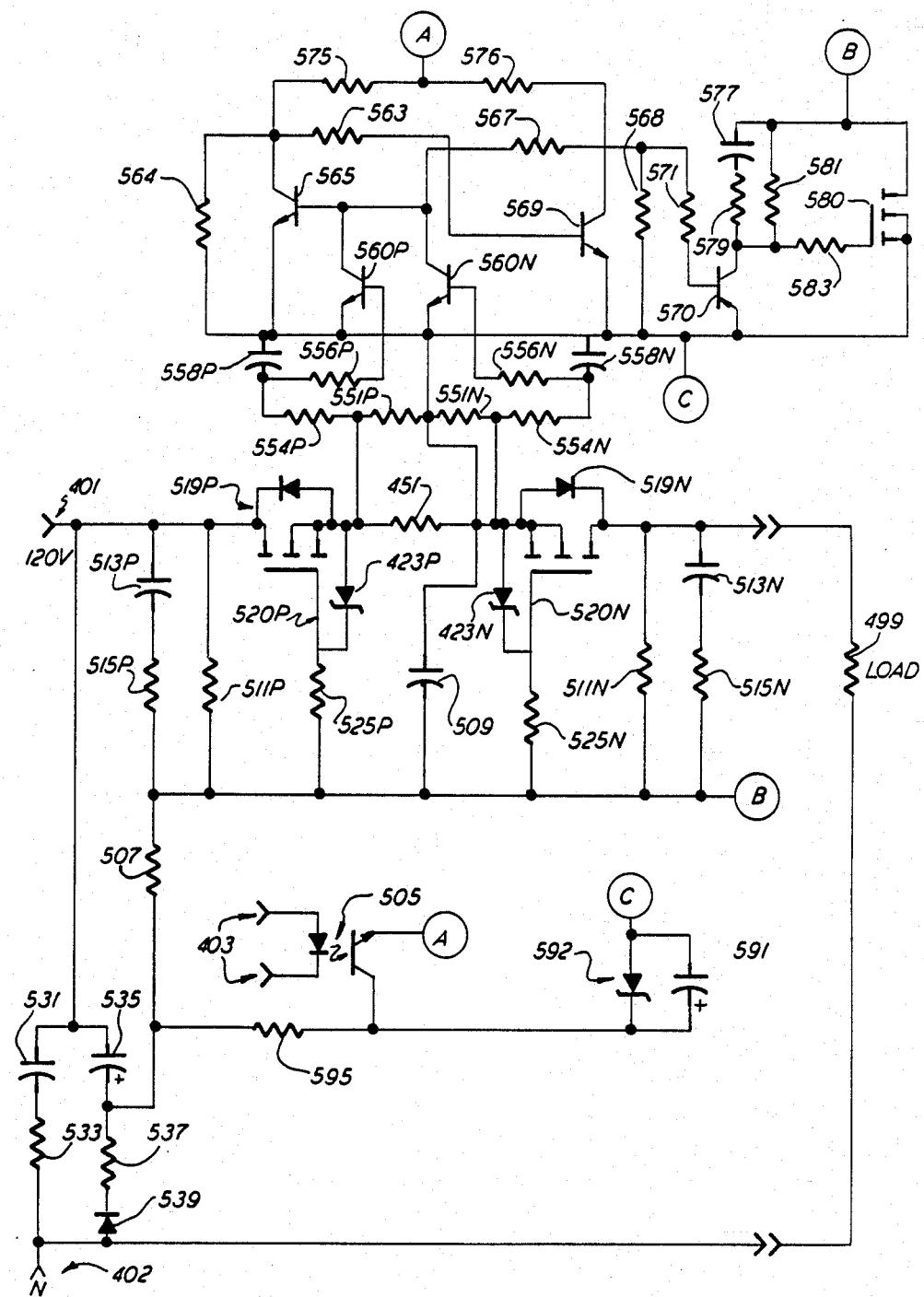
FIG. 2A is a schematic of the preferred embodiment of the power stage employed by the improved dimmer of the present invention.

Refer now to FIG. 2A where the preferred embodiment of the power stage of the present invention is illustrated. The output devices, transition control means, and transition feedback means have been integrated in a single circuit of unusual simplicity. Components in this Figure and in all subsequent Figures with the same function as those in previous Figures are identified with the same reference number. Portions of the circuit are symmetrical with respect to the polarities of the two half-cycles and those components provided for both half-cycles are identified with the same reference number, the suffix "P" or "N" identifying the half-cycle in which they are employed.

Power devices 519P and 519N are series-connected between the input 401 from the AC mains supply and load 499. Their gate inputs 520P and 520N are connected to capacitor 509, which is charged to raise the devices into conduction, the rate of charging determining the device's slew rate and, as such, the dimmer's rise time.

The drive or triggering circuit connects with the power stage via input 403. The devices are held off by discharging capacitor 509, which is accomplished by FET 580.

Because the devices employed have a gate turn on threshold of about 3 volts, a complete discharge of capacitor 509 would introduce a time delay between the drive circuit's output transition and the start of the transition, while capacitor 509 charges to the threshold voltage. By exploiting the property of FETs that a gate-to-drain connection will cause an "on" state just above the gate turn-on threshold, and by selecting a FET for 580 whose gate turn-on threshold is slightly below that of the device employed for 519P and 519N FET 580 can also serve as a biasing means which eliminates the delay. Further, as the gate turn-on threshold of FETs varies with temperature, the use of a pilot FET 580 selected for turn-on threshold/temperature characteristics similar to those of the FET employed for 519P and 519N FET 519 affords some measure of bias voltage compensation for changes in temperature.

The embodiment illustrated in FIG. 2A accepts a conventional input 403 from the drive circuit (that is, the input turns on to bring the devices into conduction). Resistor 595, shunt zener diode 592, and capacitor 591 comprise a zener-limited power supply providing a low voltage to optoisolator 505. The use of an optoisolator at this point has the added benefit of providing voltage isolation between the drive circuit and the power stage which operates at line potential.

At the desired phase angle, the drive circuit turns on, and the optoisolator 505 allows capacitor 509 to start charging. The rate of charge, and hence the transition, is determined by several mechanisms.

With the device 519P or 519N appropriate for the polarity of the half-cycle in the off state, the considerable voltage across the device allows the voltage across capacitor 509 to increase via both resistor 507 and resistor 511. Initially, the charging current through resistor 511 is larger than that through resistor 507, so capacitor 509 charges at a rate initially dependent on the line voltage. This relationship provides the transition feedback whose benefits are described in connection with FIG. 1B. The current through resistors 507 and 511 starts to charge capacitor 509, causing the appropriate device 519P or 519N to come into conduction.

Current passed by the appropriate device 519P or 519N which is determined by its transconductance is converted to a voltage drop by load 499. Because the transconductance of preferred devices is high the circuit will display a relatively high voltage gain, hence the voltage drop across the appropriate device 519P or 519N will decrease greatly for a small increase in the voltage applied to the appropriate input 520P or 520N.

When optoisolator 505 turns off capacitor 513 will start to discharge through resistor 511. At the moment that the appropriate device 519P or 519N starts to conduct capacitor 513 will have been charged to near line potential. As the appropriate device 519P or 519N comes into conduction, voltage at the end of inputs 520P and 520N connected to 401 or at the end of 519N connected to 499 will start to drop much more quickly than the voltage across 509 is rising. This will divert most of the current from resistors 507 and 511 to discharging capacitor 513 causing capacitor 509 and to remain at a relatively constant voltage. The gain of the circuit will tend to maintain the appropriate input 520P and 520N at this fixed potential as 513 discharges. The circuit will cause the appropriate transistor 519P or 519N to conduct whatever current is necessary to conform the output transition to the discharge shape of 513. If there is a sudden increase in the current required by the load, the voltage at the appropriate input 520P or 520N and across 509 will have to increase. Hence current will be diverted to charge 509. Hence 509 controls the maximum slew rate for current while 513 controls the maximum slew rate for voltage. Normally the available current is high enough that it is the voltage rise that is controlled.

The rate of discharge of capacitor 513, and hence its curve shape, is dependent on two different mechanisms. The current through 511 causes it to discharge in the exponential fashion of a simple RC constant. The current through 507 causes 513 to discharge in a linear manner. The transition of the preferred embodiment is a combination of the two. The function of resistor 515 is to limit surge currents.

The decreasing voltage potential across the appropriate device 519P or 519 N will result in a decreasing current flow through resistor 511 and as such the rate of charge of capacitor 509 until the point at which the current flow through resistor 507 will dominate. Resistor 507's current source is a line-operated DC power supply comprising capacitor 531, resistor 553, capacitor 535, resistor 537, and diode 539 which maintains a substantially constant positive voltage potential relative to source voltage and as such, a linear rate of charge for the balance of the transition period.

Capacitor 509 continues to charge until reaching the gate voltage corresponding to the maximum normal operating current, which is clamped by zener diode 423. Resistor 525 prevents high frequency oscillation of the power device.

While clamping maximum gate input voltage affords a simple, high-speed current limit, it does not suffice as the sole method of device protection for two reasons. One is that the amount of current passed at any given gate input voltage varies over temperature and from device to device. The other is that while limiting current prevents $I^2T$ failures of the semiconductor devices' bond wires, because it holds the devices within their active area, limiting current also causes the voltage potential across the devices (and with it, dissipation) to increase. The result, should the devices attempt to current-limit into a low-impedance load for more than a very short time, is thermally-induced failure of the chips themselves due to excess dissipation.

A dimmer power stage employing devices subject to such failures must provide a means limiting device dissipation as well as just current. This requires sensing a factor reliably related to dissipation. Ideally, both voltage and current would be sensed and wattage calculated from them, but the circuitry required to sense both factors and calculate the third is both complex and costly. However, if the device is still in saturation, then it behaves essentially as a resistor, and measured current is correlated closely enough to dissipation to serve the purpose of device protection. While sensing current is a less accurate method of gauging dissipation than calculating wattage and, as such, requires that the devices be specified more conservatively, it has been found that the added device cost does not justify the use of wattage calculating circuitry.

When input 403 turns on, optoisolator 505 provides power supply to the dissipation limiting circuit via point A.

When input 403 turns on, the value of the voltage divider formed by resistors 576 and 568 relative to that formed by resistors 575 and 564 assures that transistors 565 and 570 turn on while transistor 569 remains off. Turning transistor 570 on turns FET 580 off, allowing the potential between point B and point C to rise above the bias level as capacitor 509 is charged by the mechanisms of resistors 507, 511, and 515 as previously explained. Resistor 581 serves as the DC pull-up resistor for transistor 570. Resistor 583 prevents the oscillation of device 580.

As device 519 passes increasing current as capacitor 509 is charged, a voltage drop develops across resistor 451 and a voltage drop of half that value develops across each resistor 551. The particular arrangement of resistors 451, 551P, and 551N requires only one resistor in the current path, which by virtue of the relatively high cost of resistors of suitably low value and high wattage, effects a significant economy over the use of two resistors of half the value of 451. Preferably, however, a semiconductor power controlling device providing an on-chip current sensor will be employed.

Initially, negligible current flows from the appropriate resistor 551 to the base of the appropriate transistor 560, so resistors 554 and 556 have no effect and the potential across resistor 551 appears between the base and emitter of transistor 560. As current through device 519 increases, the voltage across the base of transistor 560 increases. When that voltage exceeds the $V_{be}$ of transistor 560, it is brought into conduction. This, in turn, diverts the flow of current that was established at turn on from point A to the base of transistor 565 via resistors 567 and 576. The diversion of current away from the base of transistor 565 by transistor 560 increases with increased current passed by device 519, causing transistor 565 to come out of conduction, which increases the flow of current to the base of transistor 569 via resistor 563. As transistor 569 is brought into conduction, it diverts additional current from the base of transistor 565, providing positive feedback which accelerates the process (and makes the circuit bistable).

Excess current flow through device 519 via resistor 451, therefore, "trips" the dissipation protection circuit, causing transistor 569 to divert current from the base of transistor 570 (which, as noted, was raised into conduction at turn on). By turning transistor 570 off, the potential between the gate and drain of FET 580 established by capacitor 509 causes FET 580 to turn on, discharging capacitor 509 to the bias level, thus shutting device 519 off.

Whether the dissipation limiting circuit has been tripped or not, optoisolator 505 will remove power supply from it at the end of the half cycle when the drive circuit turns off, assuring the discharge of capacitor 509 to the bias level. When the drive circuit turns on again at the desired phase angle of the following half-cycle, transistors 565 and 570 will be turned back on by the mechanisms previously described. The embodiment in FIG. 2A thus does not "latch" a fault condition, requiring a manual reset (although such operation could be readily provided). Instead it "tests" the load on each half-cycle and thus automatically resets when the fault is cleared. This does, however, mean that the power stage illustrated in FIG. 2A, when operating into a fault, would abruptly turn device 519 off under load every half-cycle, generating undesirable transients. A means is therefore provided, in the form of capacitor 577 and resistor 579 to slow the rate of turn-off to prevent such transients.

The dissipation limiting means must also ignore current transients produced by certain normal operating conditions (such as cable capacitance). Capacitor 558 is provided for this purpose.

While the dissipation limiting circuit illustrated in FIG. 2A affords a more accurate control of current than a gate clamp, it is slower in operation. Gate clamps are also provided, therefore, as a faster, if less accurate, form of protection. The time delay required for the dissipation limiting circuit to act also means that the current at the base of transistor 560 may reach a value several times higher than that at the theoretical trip point before device 519 is turned off. Resistors 554 and 556 are provided to limit excess current flow through the base of transistor 560.

The dissipation limiting circuit and gate clamp illustrated in FIG. 2A serves to protect the power devices from fault conditions caused by abnormally low impedance, but steady state overloads such as may be produced by plugging a 2000 watt lamp into a 1000 watt rated dimmer may not cause them to trip. While a circuit breaker or conventional fuse may be employed, they serve to increase the size, complexity, and cost of the dimmer. Nor are they remotely or automatically resettable. Accordingly, it is desirable to employ a long-term current limiting method for such eventualities.

Figure 2B:
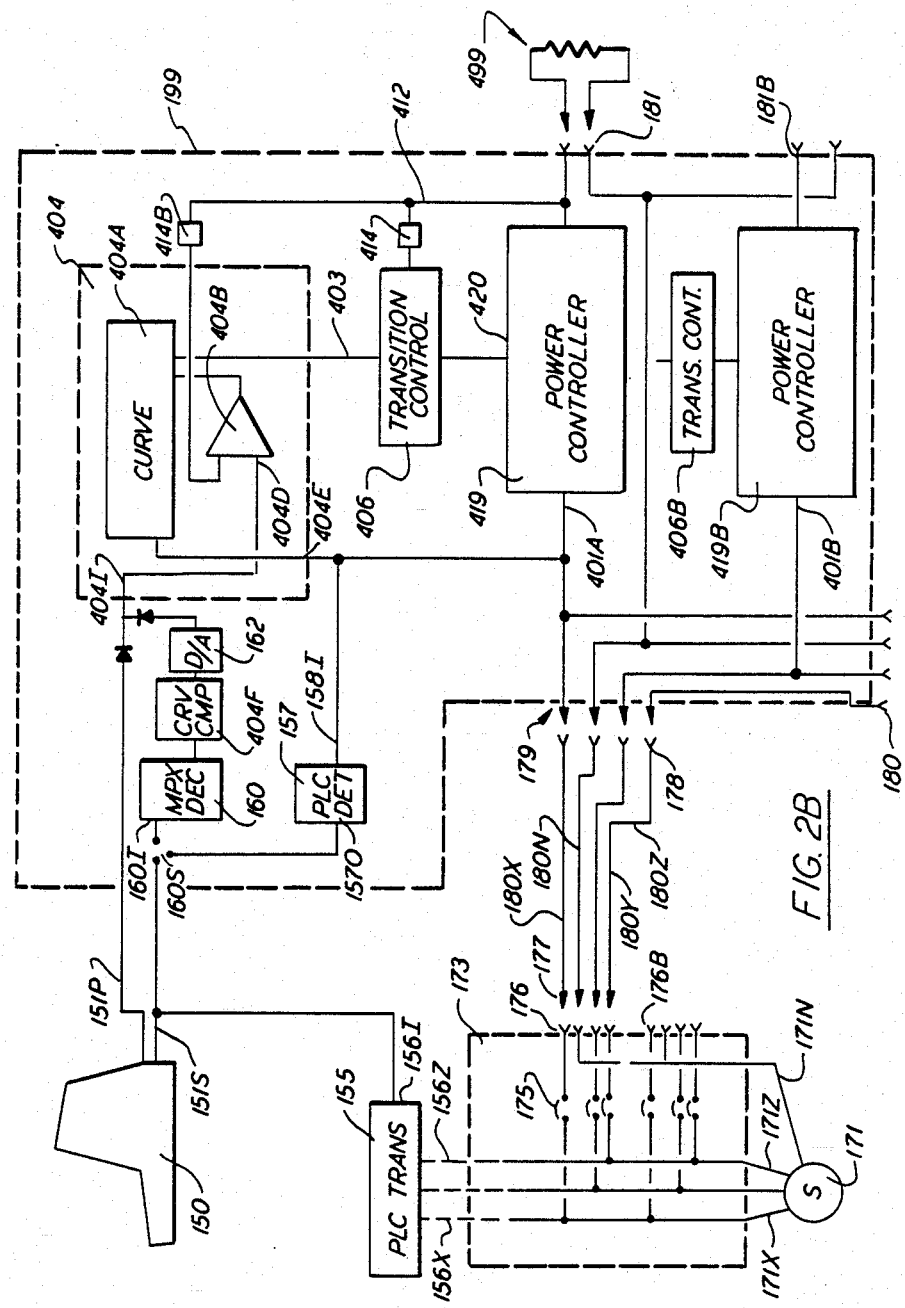
FIG. 2B is a block diagram illustrating an improved triggering circuit and typical details of an application of the improved dimmer of the present invention.

Refer now to FIG. 2B, where an improved triggering circuit particularly suited to distributed dimming applications is illustrated.

All phase control dimmers require a triggering circuit which functions as a timer whose delay between zero-crossing and triggering the change in state of the power device is determined by the desired average power setting (as represented by a corresponding value present at its control input).

Most prior art dimmers have employed analog circuitry for this function, but the performance of such circuits is frequently dependent upon not just circuit design but component variations and temperature.

Many dimmers (such as that disclosed in U.S. Pat. No. 3,397,344) have employed negative feedback to reduce such variations, but classical fedback triggering circuits have an inherent "curve" or family of control input value/output power relationships which is less than ideal. There has therefore been a tendency to modify such circuits to produce a more desirable curve, at the cost of stability.

Prior art analog triggering circuits, whether open-loop or fedback, have proven difficult to design well and require regular adjustment if consistent response is to be maintained, both from month-to-month and from dimmer-to-dimmer. Such consistency has become more important with the transition to dimmer-per-circuit, because the lamps on a common control channel are on separate dimmers, which emphacizes any discrepancies between them in response.

The "digital" dimmer, as generally disclosed in U.S. Pat. No. 4,241,295, is theoretically simple to design, immune to component variations, and capable of reproducing any "curve" with total consistency. Several drawbacks have, however, become apparent. One is the difficulty of providing a line regulation scheme which compensates for real-world distortions in the AC waveform, and hence total power. Overall negative feedback compensates for such variations, but while relatively simple to provide in analog circuits, such feedback (or an equivalent feedforward function) is far more complex to implement in digital ones.

Digital triggering circuits also have higher parts costs than analog schemes, and therefore have generally been restricted to applications where a single triggering circuit can be shared by as many as twenty-four power stages.

A distributed dimmer system places a premium on triggering circuits which are simple in design, cost-efficient in single dimmer applications, are fully line-regulated, require little or no adjustment, and are highly consistent in response. FIG. 2B illustrates a "precision analog" triggering circuit meeting these objectives.

FIG. 2B illustrates a dimmer enclosure 199, containing one or more power stages comprising a power controller 419 with an associated transition control means 406.

The transition control means 406 accepts a phase control input via 403 from triggering means 404, which is illustrated as accepting an input via 404I, corresponding to a desired average power to be supplied to lamp load 499, and as responsive to the zero-crossing of the alternating current waveform detected via 404E.

Improved triggering means 404 is illustrated as comprising a phase angle converter 404A which determines the relationship between the desired average power condition at input 404I and the firing angle supplied to the power stage. In a known manner, negative feedback (here illustrated as a differential amplifier 404B) is used to minimize the effects of variations in both input power and dimmer performance by comparing the desired value with actual dimmer output as sensed via 412, and by advancing or retarding the phase angle as required.

Unlike prior art dimmers, the dimmer of the present invention maintains a closed loop gain of greater than 10 over its entire range of adjustment. This has the effect of greatly increasing the stability of dimmer performance over prior art, although it produces a less desirable "curve". This is corrected by deliberately distorting the control signal to the dimmer input 404I, such that the characteristic response of the feedback network restores the input value/output voltage relationships to the desired "curve". Many methods of performing this correction are possible. Here a curve correction means 404F, comprising an EPROM lookup table, is inserted in the input at the digital level, although such correction can be performed, less desirably, at the analog level.

In contrast to prior art designs, which limit closed loop gain and modify feedback network operation to maintain an acceptable "curve" at the cost of stability, the improved triggering means of the present invention uses unusually high closed loop gain to produce stability, and achieves the previously contradictory object of an acceptable curve by compensation outside the feedback network.

Further, prior art triggering stages have employed a network 414B which produces a DC voltage approximately related to (and therefore stabilizing) average voltage at the lamp. Lamp brightness is, however, determined by RMS voltage. The relationship between average and RMS voltage varies with changes in waveform shape produced by changes in firing angle, and therefore such dimmers cannot maintain stable lamp brightness with changes in line voltage. The use of a network whose output is related to RMS voltage provides the basis for more accurate regulation, but the characteristic output of such circuits would produce an unacceptable "curve". The use of such an RMS network 414B in combination with the disclosed precompensation technique permits the significant improvement in dimmer regulation produced by RMS voltage sensing, while maintaining an acceptable curve.

FIG. 2B further illustrates a typical application of the improved dimmer of the present invention.

AC mains supply 171 is illustrated as supplying at least one multiple-phase branch circuit distribution panelboard 173, including circuit breakers 175 providing overcurrent protection for a plurality of branch circuits.

Distribution panelboard 173, which may be permanently installed in a facility or designed for portable use, provides for the connection of branch circuits, whether by permanently-installed raceways and conduits or by means of portable cables (such as 180) and connectors (such as panelboard receptacle 176, and cable connectors 177 and 178). Such cables and connectors may be single circuit or, as illustrated, multiple circuit. Branch circuits are provided for a plurality of dimmer enclosures 199 at spaced apart locations, each in proximity to at least one controlled fixture. The design of such enclosures may allow for plugs or inlets for power (such as 179, 621 of FIG. 6A, and 753 of FIG. 8C); outlets for lamp loads (such as 181, 211 of FIG. 6B, and 211A-C of FIG. 8B); and feed-thru outlets (such as 180, and 752 of FIG. 8A) to permit parallelling additional dimmers/enclosures to the same branch circuits.

It will be understood that many applications will involve multiple levels of branch circuit distribution. It will also be understood that a distributed dimmer enclosure may incorporate some level of branch circuit distribution itself, for example from a 20 or 30 Ampere supply conductor to two or three 1000-watt rated dimmers.

Local potentiometers can be mounted on or located near the dimmer enclosure, but typically the system provides at least one known lighting control console 150 to specify the desired average power to be supplied to each of a plurality of controlled fixtures, and hence their intensity, together with a means to couple the output condition of the console 150 representing the desired average power for a dimmer with the input 404I of its triggering circuit 404.

This means to couple may take one of several forms, each well known in the art.

A discrete parallel output 151P of lighting console 150, typically an analog voltage varying between 0 and 10 vDC, may be supplied to each dimmer or group of dimmers responsive to that given output.

A serial output 151S of lighting console 150, either analog or digital (e.g. conforming to the serial standards of the United States Institute of Theater Technology, New York, N.Y.), may be supplied to all dimmers, each dimmer or group of dimmers employing a multiplex decoder 160 which is set for its own address to recognize the appropriate desired average power value in the serial data stream.

Separate cables and connectors may be employed for power and signal or common connectors and/or cables employed.

Alternatively, a serial output of lighting console 150 may be supplied to known power line communications transmitter 155, which impresses a coded data stream on the AC supply 171 via outputs 156X-Z. Known detector circuitry 157 at the dimmer strips the data from the powerline for demultiplexing. The widely-employed "BSR" system sends commands which increment or decrement the desired average power values held in a register at the addressed dimmer. The actual desired average power value may also be transmitted.

Preferably, a common integrated circuit or package, together with switch 160S and diodes at the input 404I to triggering circuit 404 permit the dimmer to accept parallel, serial, or powerline signal inputs.

Inexpensive power line communications hardware places severe limits on maximum baud rate. Due to this limited baud rate, neither system is suitable for most professional applications because the time required for each dimmer adjustment makes it impractical to execute "cues" in which large numbers of dimmers transit from old to new values in apparent simultaneity.

If, however, a short-term memory means is provided at the dimmer, such that a plurality of desired average power values can be stored, each referenced to an identifying "preset" or "cue" number, then the output of that number by the lighting console 150 over the power line communications transmitter 155 could cause an unlimited number of dimmers to transit to new values simultaneously, well within the limited baud rate of the system.

Figures 3A, 3B:
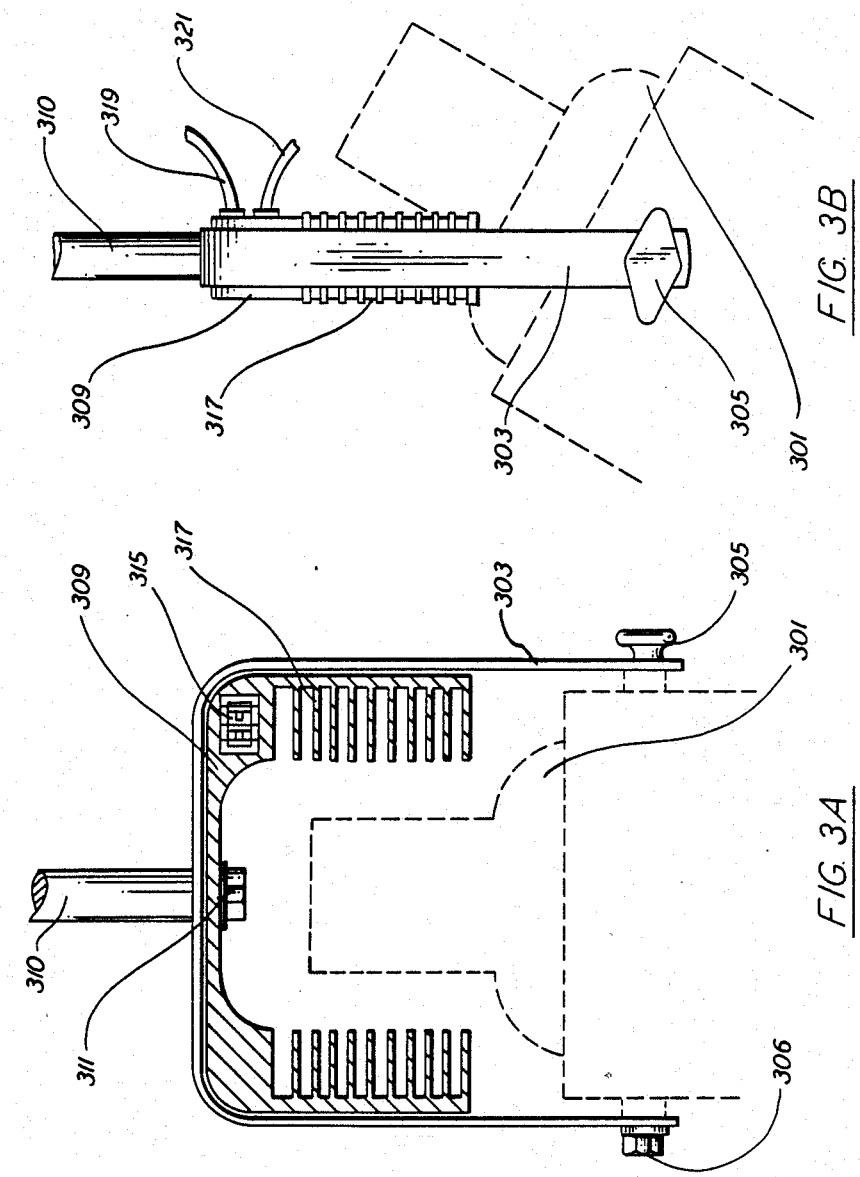
FIG. 3A is a front elevation of an embodiment of the improved dimmer of the present invention adapted for mounting within the yoke of a fixture.
FIG. 3B is a side elevation of the embodiment of FIG. 3A.

Refer now to FIGS. 3A and 3B where a first embodiment of the improved dimmer of the present invention is illustrated.

The use of a distributed dimmer which is functionally integral with the fixture it controls has long been a desirable object, in part because it presents no incremental increase in handling labor. Ideally, the dimmer would be contained within the fixture yoke, but the volume of a dimmer filtered to professional standards would exceed the clearances available between most production fixtures and their yokes. This would require the substitution of a custom, elongated yoke which is less than desirable for a variety of reasons. More commonly, dimmers of this type have been attached to the exterior of the fixture yoke. In this location, they significantly reduce the maximum number of fixtures which can be employed on many types of lighting position, by increasing the minimum mounting centers. They may reduce the number of fixtures which may be accommodated in some types of shipping crate; may hinder access to the fixture during focusing; and are vulnerable to damage during handling.

Referring to FIGS. 3A and 3B, fixture 301, illustrated as an ellipsoidial reflector spotlight (such as manufactured by Colortran, Inc., Burbank, Calif.), includes a formed metal yoke 303 which allows vertical adjustment about an axis through handwheel 305 and bolt 306. Yoke 303 is, in turn, attached via bolt 311 to the fixture mounting position, here illustrated as via the stud 310 of a standard "C-clamp". Freed of the requirement for a bulky filter inductor (or capacitor) the improved dimmer of the present invention may be accommodated within a housing 309, here illustrated as an aluminum casting, designed to conform to the interior surface of yoke 303. Heat sink fins 317 are cast into enclosure 309, with an interior profile which provides adequate clearance for fixture 301 in all orientations. High-temperature lead 321 connects the fixture with the dimmer, lead 319 connects the dimmer with power and signal inputs. Additional controls including an address thumbwheel switch 315, signal indicator, neon pilot light, and self-test button are provided. Housing 309 provides a pass-hole for bolt 311, which is inserted through both housing 309 and yoke 303 into the internally-threaded portion of stud 310, mounting fixture and dimmer in the same operation.

The improved dimmer of the present invention in the embodiment of FIGS. 3A and 3B thus achieves the long-desired object of mounting a dimmer to its fixture with none of the disadvantages of prior art units. For the first time, professional standards of performance are achieved with no increase in fixture bulk, minimum mounting centers, or shipping volume.

Figure 4B:
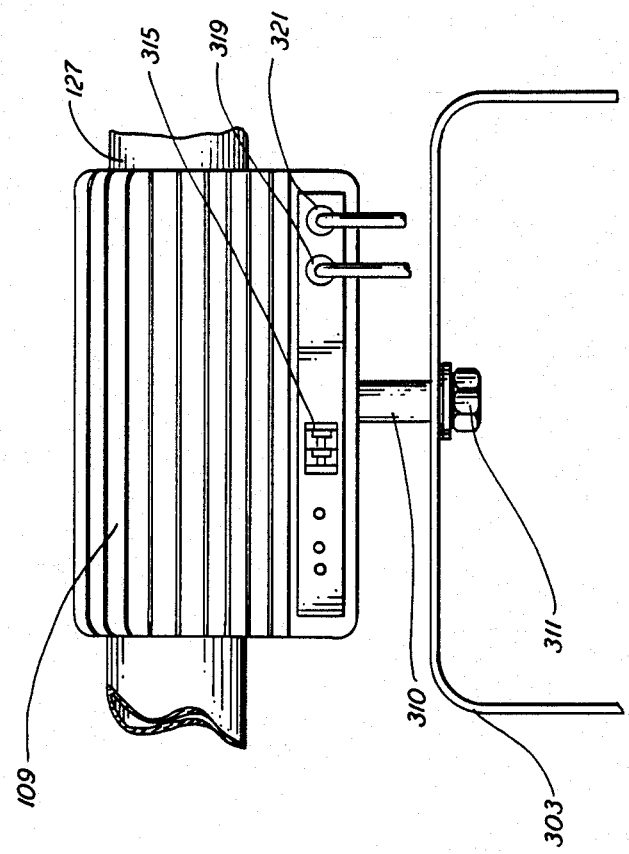
FIG. 4B is a rear elevation of the embodiment of FIG. 4A.
Figure 4A:
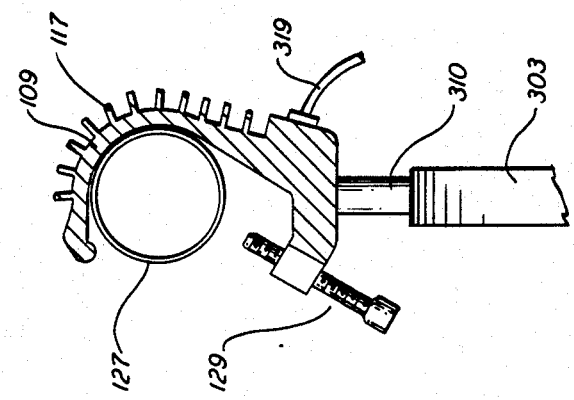
FIG. 4A is a side elevation of an embodiment of the improved dimmer of the present invention adapted for use as a lamp-supporting clamp.

FIGS. 4A and 4B illustrate a second embodiment of the improved dimmer of the present invention.

As an alternative to mounting a dimmer on the fixture itself, some prior art distributed dimmer schemes have employed single-dimmer enclosures which attach to the same mounting position as the fixture rather than to the fixture itself. The resulting boxy enclosures compete with the fixtures for location on the pipe or rail and complicate the mounting and movement of fixtures as well as access to them.

FIGS. 4A and 4B illustrate that the improved dimmer of the present invention is uniquely capable of conforming to the mounting position. The dimmer enclosure could be designed as a substantially cylindrically-shaped collar which surrounds the pipe from which fixtures are most frequently hung. Here, the function of the dimmer enclosure has been further combined with that of the clamp which attaches the fixture to the mounting position.

Referring to the Figures, the improved dimmer of the present invention has been installed in a housing 109, here illustrated as fabricated from an aluminum extrusion, which includes the basic profile of a "C-clamp" which grips steel pipe 127 by tightening bolt 129 in the prior art manner. Stud 310 is provided for the attachment of the yoke 303 of any lighting fixture, using bolt 311 as previously described. The external surface of housing 109 is provided with heat sink fins 117, and some additional sinking may result from conduction through pipe 127. High-temperature lead 321 connects the fixture with the dimmer; lead 319 connects the dimmer with power and signal inputs. Additional controls including an address thumbwheel switch 315, signal indicator, neon pilot light, and self-test button are illustrated.

The improved dimmer of the present invention in the embodiment of FIGS. 4A and 4B thus achieves the desirable object of attaching the dimmer to the same mounting position as the fixture with none of the disadvantages of previous methods. Fixture and dimmer are mounted and moved in a common operation, with no undesirable increase in bulk at the position.

The use of distributed dimmers as illustrated in the previous Figures requires providing both power and signal, whether multiplexed or discrete, by means of portable cables and temporary connections. While separate cables and connectors can be used for each function, in many cases it would be desirable to employ a single connector for both. While multi-pole multi-connectors have been employed to distribute both power and signal in other performance lighting applications, such connectors are difficult to field install and have no commonality with the industry's standard power connectors.

Refer now to FIGS. 5A-5I, where an improved connector system for simultaneously distributing power and signal is illustrated.

FIGS. 5A and 5B illustrate a 20A 125VAC grounded "pin" connector 201 (such as the model 2P&GMC as manufactured by Union Connector Co., Inc., Roosevelt, N.Y. 11575) which has long been the standard of the industry. The connector 201 provides split brass pins 203 for hot, neutral, and ground. Flexible conductors such as cable 209 enter the connector body via a molded-in strain relief, and the individual conductors are terminated using uninsulated ring crimps.

FIGS. 5C and 5D illustrate a mating panel-mounted receptacle 211 (such as the Model 2P&GF-FL by the same manufacturer). Similar cable-mounted receptacles (such as the model 2P&GFC) are also available.

FIGS. 5E and 5F illustrate an improved connector 221 for both power and signal. The power portion of the connector body duplicates the body of connector 201. However, a well 225 is added to accommodate an insert 227 mounting pins 223 for the low-voltage signal connection. Such pins could be installed captive to the body of connector 221, but preferably a removable insert 225 is employed, and accordingly a retaining barrier 226 is illustrated. The use of a removable insert has the benefit of allowing the use of a stock low voltage connector insert (such as manufactured by Hypertronics Corp., Hudson, Mass. 01749), reducing the cost of developing connector 221 to little more than enlarging the die for the body of connector 201. Further, different termination techniques may be employed for the power and the signal conductors, and the termination operation for the latter performed outside the connector body. While a rectangular insert with three parallel pins is illustrated, it will be understood that it may be desirable to employ a circular "XLR"-type insert (such as manufactured by ITT Cannon Electric, Santa Ana, Calif. 92702).

The body of connector 221 is provided with dual strain reliefs to allow the use of separate power and signal cables 228 and 229 or a common cable for both functions.

FIGS. 5G and 5H illustrate a mating panel-mounted receptacle 231 (and, by extension, a cable-mounted receptacle). A protruding enclosure 235 for the signal insert 237 is cast into the receptacle body. It will be apparent that one benefit of this arrangement is that the smaller male signal pins 223 can be shrouded by the body of connector 221 for protection from damage in handling. It will also be apparent that any improved connector 221 can be mated with a conventional receptacle 211, and that any conventional connector 201 can be mated with an improved receptacle 231. Thus, any cable constructed with the improved connector remains completely "downward-compatable" with conventional dimming equipment, vastly simplifying the user's inventory.

Alternatively, a combined signal and power connector body can be produced by attaching (either temporarily or permanently) a housing 241 for the signal insert 227 to a power connector body 201, here illustrated as by means of dovetail joints 219 and 249 cast into the finger grips. Similarly, the plug or receptacle may incorporate an adaptor to an RJ-11 or similar modular jack, allowing a transition to prefabricated signal cables.

Multi-phase versions of the connector can also be readily produced.

A third embodiment of the improved dimmer of the present invention is illustrated in FIGS. 6A, 6B, and 6C.

As previously described, a practical distributed dimming system would offer important practical advantages in permanent installations. No elaborate system of carefully identified conductor pairs would be required between the fixture positions an distant dimmer racks, nor need spaces be set aside for the latter which must be ventilated and sound-isolated. Instead, the use of a fully distributed dimming scheme would permit the installer to connect the receptacles on the connector strips with conventional circuit breaker panels, located in proximity to the supplied circuits in a manner calculated to maximize both convenience and economy. In the case of outlet boxes, the required branch circuit distribution breakers could be made integral with the dimmer enclosure, such that only power feeders and a signal conductor need be supplied to the unit. Alternatively, particularly where access to the fixture position is limited, the dimmer enclosures can be mounted at a nearby location, such as, for example, above the catwalk or in a vertical array on the studio or auditorium wall. The thermal load presented by the dimmers in any of these embodiments would be distributed throughout the performance area, hence no special cooling or ventilating provisions would be required.

In the case of connector strips, a prior art fully distributed scheme has been proposed in the form of connector strip in whose elongated metal enclosure thyristor dimmers are installed. Such a scheme has many disadvantages. The use of the connector strip as the mounting enclosure may result in an undesirable internal heat rise caused by the thyristors, and particularly by the choke—one which is aggravated by the lack of internal ventilation and the elevated ambient air temperature produced by nearby fixtures. The bulk of the choke reduces the cross-sectional area of the enclosure available for wiring. The internal mounting of the dimmer components also makes service very difficult given the dimmer location.

Refer now to FIGS. 6A-6C, where a third embodiment of the improved dimmer of the present invention is illustrated.

Elongated metal raceway enclosure 641 mounts a plurality of receptacles, spaced as desired. Unlike conventional prior art connector strips, receptacles are provided for both power and signal. Separate receptacles may be provided for each function, but preferably a common receptacle (here illustrated as receptacle 231 of FIGS. 5G and 5H) is employed.

While improved dimmer of the present invention could be installed in the raceway enclosure 641, it has been installed in a housing 609, here illustrated as an aluminum casting, which is independent of raceway enclosure 641. Housing 609 has been provided with an inlet connector 621, illustrated as a panel-mounted version of connector 221 (as illustrated in FIGS. 5E and 5F), which supplies power and signal from receptacle 231. An outlet receptacle 211 (as illustrated in FIGS. 5C and 5D) is provided for the lamp. Address selector switch 315 and additional indicators and a self-test switch are provided adjacent to connector 211. Housing 609 has been illustrated with cast heat-sink fins 617.

Alternatively, the outlet receptacle 211 for the fixture may be mounted to the raceway enclosure 641, and the dimmer provided with an inlet connector 621 with two "hot" poles, one for supply and one to return the dimmer output to the raceway enclosure 641 for connection to lamp receptacle 211. It will further be understood that separate, parallel raceway enclosures may be provided for power and signal, or alternatively, that an internal partition may be installed in raceway enclosure 641 to separate the two conductor types. It will also be understood that continuous busses may be employed for power and/or signal conductors, and that in some embodiments, the dimmer enclosure may be provided with an inlet connector which attaches directly to the busses. It will further be understood that signal may be distributed in parallel rather than serial form, and that in serial embodiments, the dimmer address may be predetermined by the receptacle itself.

Many designs for housing 609 are possible, and should not be understood as limited except by the claims. It is here illustrated as having a profile, visible in FIG. 6C, including a recessed portion having a shape complementary to that of raceway enclosure 641, such that when connector 621 is mated with receptacle 231, the dimmer produces only a modest increase in the bulk of raceway enclosure 641. This arrangement has the added benefit of assisting in aligning connector 621 with receptacle 231 during mating, and of protecting both connectors from damage caused by shear forces should the dimmer enclosure be struck an accidental blow.

The embodiment of the improved dimmer illustrated in FIGS. 6A-6D offers a number of unique advantages. The unit can provide EMI and audible lamp noise suppression meeting or exceeding the highest current professional standards yet is totally silent under all loads and at all phase angles. The thermal design of the raceway enclosure 609 is also simplified.

Because the dimmer is mounted in an external, detachable enclosure, there is no significant reduction in the cross-sectional area of the raceway enclosure 641, and hence in the space available for power and signal conductors 643, nor are such conductors exposed to the increase in temperature produced by mounting dimmer components within the raceway enclosure 641 itself.

Further, service is simplified, as a failed dimmer is simply unplugged and replaced with a spare. However, unlike dimmers employing either bulky inductors (or capacitors), the profile of the dimmer can be minimized, and with it, the increase in total connector strip/dimmer profile.

The illustrated embodiment has an additional important advantage.

The prior art distributed dimmer scheme described, if installed in a facility, would offer the savings in installation costs previously described. However, it requires the installation of a dimmer for every outlet, which is hardly ideal in installations, like television studios, which may use only a fraction of their outlets at any one time.

The embodiment of FIGS. 6A-6C offers a uniquely flexible alternative. Those installations which use a high proportion of their outlets can plug a dimmer enclosure into each one. Those installations with lower utilization can maintain an inventory of dimmers slightly larger than their fixture inventory, and employ them on an as-needed basis. Indeed, both strategies can be used within a single installation, with a "dimmer-per-outlet" approach at some positions, and "dimmer-per-fixture" at others. Further, as illustrated by connector 231 in FIG. 6A, the use of standardized power and signal connectors for the dimmer enclosure 609 allows plugging "dimmer-on-lamp" units (as illustrated in FIGS. 3A-4B) into the connector strip as well.

While FIGS. 6A-6C illustrate an embodiment in which the dimmer is associated with an elongated raceway enclosure, the enclosure 641 does not support the fixture itself. It will be apparent that this function could be provided.

While lamp supports with integral dimmers have been disclosed for semi-professional use, the size and weight of the choke required for truly professional EMI and audible lamp noise suppression would produce an undesirable increase in the size and weight of the resulting lamp bar, particularly in those portable systems which presently permit a single technician to handle a 6-lamp bar.

FIGS. 7A and 7B illustrate a fourth embodiment of the improved dimmers of the present invention adapted for such applications.

Housing 709, here illustrated as an aluminum extrusion, provides an elongated support for fixtures 301, which are attached with bolts 311 to Unistrut track nuts (as produced by Unistrut Corp., Wayne, Mich. 48184), riding in track 721. Power devices 419 are mounted to the extrusion, which also includes heat sink fins 717. Printed circuit card 725 mounts beneath protective cover 727. Fixture cord 321 enters housing 709 via right-angle strain relief 729. A single multi-pole connector such as the Model CIRO30-28-9S by the Veam Division of Litton Systems, Inc., Watertown, Conn. 06796 supplies multi-phase power and control signals via a receptacle 753 mounted to the housing 709. Multi-conductor cable 755 connects the lamp bar to power and signal via connector 751.

FIGS. 7A and 7B illustrate that the improved dimmer of the present invention is uniquely capable of producing an integral dimmer enclosure/lamp support of minimal size and weight while maintaining professional standards of dimmer performance.

Finally, while distributed dimmer systems like that of FIGS. 7A and 7B which package dimmers integral with a lamp support and on regular mounting centers are practical for certain types of touring systems, they are not practical for many theatrical productions, which vary the number and mounting centers of fixtures per mounting position as well as the arrangement of fixtures at the mounting position itself.

A theatrical production may, for example, hang fixtures on 18" centers on one pipe and on 24" centers on another, while requiring clumps of three circuits at borderlight pigtails. The production may pack one pipe with fixtures, while using less than a half-dozen on another; sidearm a single vertical row of fixtures on the downstage boom and a double row in the boxes.

It will be apparent that, on one hand, a system of dimmers on fixed mounting centers and/or in an elongated housing as illustrated in FIGS. 6A-7B is impractical for many of these variations, while a system of single dimmer enclosures as illustrated in FIGS. 3A-4C requires an undesirably large number of discrete supply cables and connections.

Refer now to FIGS. 8A-8D where a fifth embodiment of the improved dimmer of the present invention is illustrated which provides a single enclosure design equally suited to each such variation.

Figure 8C:
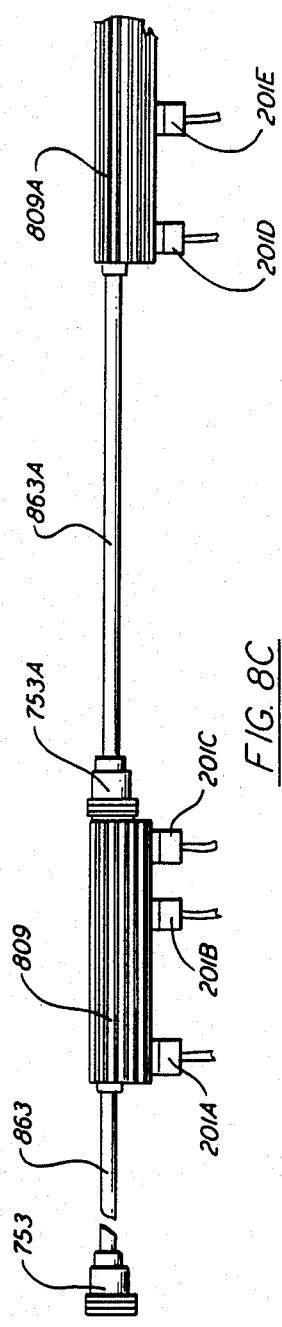
FIG. 8C is a plan view illustrating one application of the embodiment of FIG. 8A.
Figure 8D:
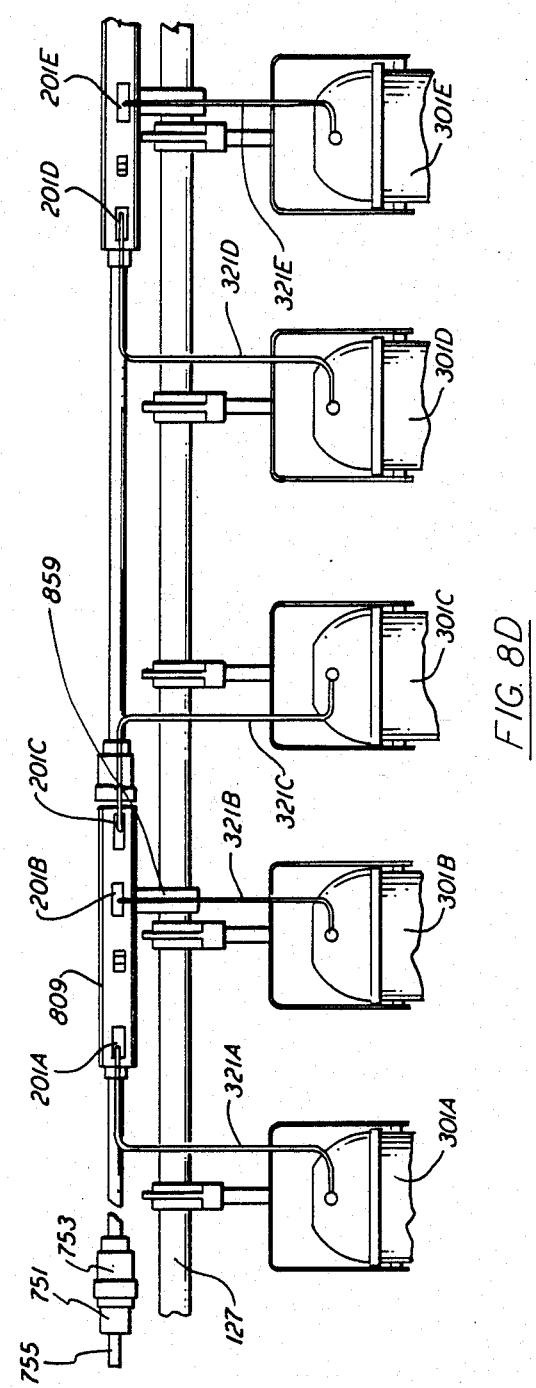
FIG. 8D is a front elevation of FIG. 8C.

FIG. 8A is a plan view of the embodiment. FIG. 8B is a front elevation. FIG. 8C is a plan view illustrating one application of the embodiment. FIG. 8D is a front elevation of FIG. 8C.

Enclosure 809 contains three discrete power stages, supplying receptacles 211A, 211B, and 211C respectively. Male multi-pole multi-connector 753 supplies both signal and three-phase 120/208 volt power, to which both the dimmers and a female multi-pole receptacle 752 are parallelled, the latter so that additional enclosures may be "daisy-chained" to the same cable (e.g. enclosures 809 and 809A both supplied by cable 755). One power stage is connected to each of the three phases.

Many designs for enclosure 809 are possible, and should not be understood as limited except by the claims. Heat sink fins 817 or "pin fins" 818 may be provided, and a common chassis used for all three power stages, or each power stage packaged on a removable submodule (e.g. 819).

The embodiment illustrated employs a single membrane switch panel 820, as manufactured by the Xymox Division of W. H. Brady Co., Milwaukee, Wis. 53201, which provides test buttons such as 320 and transparent portions for signal and power indicators such as 318 and 320, which may mount to a printed circuit card beneath it. The function of address thumbwheel switch 315 in the previous Figures is performed by the combination of an up/down counter responsive to up/down buttons 816 and display 815, a two-digit 7-segment LED array. To prevent accidental changes in address, a "set" button 817 is provided which must be depressed to enable up/down buttons 816.

Referring now to FIGS. 8C and 8D, enclosure 809 may be mounted to a pipe (or any similar support) using a clamp 859. In contrast to the boxy enclosures which have previously been disclosed, the improved dimmer of the present invention can be installed in an enclosure of minimal size, whose elongated shape minimizes obstructions and locates receptacles 211A–211C such that all three fixtures supplied by the enclosure (e.g., 301A, 301B, and 301C) may be plugged into the receptacles without the requirement for an extension cable. Further, adjusting the distance between two enclosures (e.g., 809 and 809A), allows adapting to a variety of fixture mounting centers.

While inlet multi-connector 753 could be panel-mounted, it is preferably installed at the end of a pigtail comprising a length of flexible conduit 863 containing the required power and signal conductors 861, attached to enclosure 809 via hub 865. Plugging the male inlet connector 753 of one enclosure (e.g., 809A) into the female receptacle 752 of a second enclosure (e.g., 809) connects the two without the requirement for a separate jumper and automatically spaces the two enclosures by the distance required to accommodate the regular mounting centers of fixtures 301A–301E. It will be apparent that the combination of the enclosures of FIGS. 8A-8D with multi-conductor and conventional stage pin connector equipped cables, provides a uniquely efficient method of dimming fixtures on pipes and similar elongated supports, whether packed together on regular centers or widely and irregularly spaced apart.

It will further be apparent that a single such enclosure can be located on the ground or in the air wherever a borderstrip or cyclorama light requires three circuits, and that the same enclosure, oriented vertically, singly or in pairs, is equally applicable to booms and similar vertical positions.

The use of a plug-through design permits most efficient use of a cable, as any number of enclosures can be "daisy-chained" to the maximum capacity of the supply cable 755. Thus, given a supply cable rated at 20 Amperes, one enclosure can control three 20A loads, two enclosures can control six 1000-watt fixtures, and a third enclosure can be added when 750-watt fixtures are employed.

The use of three-phase power makes most efficient use of the cable by minimizing the number of conductors required, while employing three power stages per enclosure evenly distributes the load—and provides the maximum number of outputs which a single enclosure can supply to almost any arrangement of fixtures without the requirement for extension cables.

The illustrated embodiment offers a heretofore unattained combination of benefits. In contrast to present professional practice which requires the time consuming preparation of single or multiple circuit cables of the correct length, carefully identified with the required circuit number, and the use of large, heavy, and expensive dimmer racks in a central location; a user of the illustrated embodiment of the improved dimmer of the present invention need do little more than circle triplets of fixtures on the light plot and order a corresponding number of enclosures, along with an assortment of cables. At the load-in, enclosures are simply clamped to the mounting positions and their addresses set, then connected with one or more portable circuit breaker panels located for maximum convenience, using multi-conductor cables which need not even be identified. The resulting system not only requires less labor to prepare and install, but less capital to build, due to the dramatically less expensive cable and multi-connectors which can be employed as well as the savings produced by the replacement of the large and mechanically complex racks. Yet these savings come with no offsetting disadvantages. The improved dimmer of the present invention adds little bulk or weight to the fixture position while providing EMI and audible lamp noise suppression equal to or better than the highest professional standards, contributing no audible noise or strong magnetic fields itself.

The preferred embodiments disclosed serve to illustrate the unique advantages of the improved dimmer power stage of the present invention in distributed applications. It will be apparent to those of skill in the art that other variations and embodiments are possible.

The triggering circuits may be located remotely from the power stage.

Parallel, serial, or wireless transmission (including power line, infrared, or ultrasonic) of control signals may be employed.

Signal and power conductors for any of the embodiments may be combined in common cable and/or connector assemblies, or separate cables/and or connector assemblies may be employed.

The power stage, triggering, and/or transition control means may be integrated in a single semiconductor package.

While the preferred embodiment is a power stage employing the conventional phase control approach, it will be understood in the context of the parent application, that the disclosed techniques may be applied to power stages employing conventional, reverse, or symmetrical phase control operation.

While the preferred embodiment illustrated is for a power stage having an AC output, it will be understood in the context of U.S. Pat. No. 4,438,356 that rectification could be employed such that the output of the power stage would be DC. Such an arrangement would further reduce audible lamp noise, while its use in a distributed application eliminates the requirement for DC rated connectors and two-wire operation except at the fixture, while simplifying the operation of arc-detection circuitry, if employed.

The combination of rectification with a filter capacitor and voltage feedback would offer the further prospect of compensating for voltage drop to maintain full RMS voltage at the lamp.

Other variations may be made without departing from the spirit of the invention, which should not be understood as limited except by the claims.

What is claimed is:

1. Electronic dimming apparatus comprising a semiconductor power controlling means for coupling a lamp load to an alternating current source, and for variably controlling the average power supplied to said lamp load by adjusting the relative proportion of substantially each half-cycle of the alternating current waveform in which said semiconductor power controlling means is in a substantially conductive versus a substantially non-conductive power condition; said semiconductor power controlling means having a control input and adapted to modulate the instantaneous amplitude of the voltage or current supplied to said lamp load under the active control of said control input, said semiconductor power controlling means further having an inherent minimum duration required for a transition between one and the other of its substantially conductive and substantially non-conductive power conditions in response to a stepped change between a value at its control input producing the one and a value producing the other of said power conditions; means for triggering responsive to at least a first input condition corresponding to a desired average power to be supplied to said lamp load and further responsive to the zero-crossing of said alternating current waveform, said means for triggering having at least one output, and producing at least one change in condition at said output substantially corresponding to the phase angle of said alternating current waveform of said half-cycle at which said semiconductor power controlling means must change from one of said power conditions to the other of said power conditions to supply said desired average power to said lamp load; means for transition control responsive to said output of said means for triggering and having an output coupled to said control input of said power controlling means, for controlling the duration of the change between said value at said control input of said power controlling means producing the one and said value producing the other of said power conditions, such that the power condition of said semiconductor power controlling means is gradually changed between one and the other of said power conditions over a period greater than said inherent minimum duration and less than the remaining portion of said half-cycle, whereby the electro-magnetic interference product of said transition is decreased, wherein said semiconductor power controlling means has a relationship between control input voltage and output current, and further including means to non-destructively limit peak current that clamps the maximum voltage at said control input at a value within the safe operating region of said control input so as to limit the maximum current supplied by said semiconductor power controlling means to a value greater than the maximum current required by the normal operation of said lamp load and less them the value that may cause destruction of said power controlling means.

2. Apparatus according to claim 1, wherein said means to non-destructively limit peak current comprises at least one zener diode clamping said control input.

3. Apparatus according to claim 1, and further including means to sense a value corresponding to current passed by said semiconductor power controlling means; means to detect an overcurrent condition responsive to said means to sense a value corresponding to current; and means to cause a transition to non-conduction for at least the remainder of said half-cycle upon detection of said overcurrent condition.

4. Apparatus according to claim 3, wherein said means to non-destructively limit peak current and said means to detect an overcurrent condition have separately determined current limiting thresholds.

5. Apparatus according to claim 3, wherein the duration of said transition in response to an overcurrent condition is less than the duration of a transition under normal conditions, and greater than said inherent minimum duration.

6. Electronic dimming apparatus comprising a semiconductor power controlling means for coupling a lamp load to an alternating current source, and for variably controlling the average power supplied to said lamp load by adjusting the relative proportion of substantially each half-cycle of the alternating current waveform in which said semiconductor power controlling means is in a substantially conductive versus a substantially non-conductive power condition; said semiconductor power controlling means having a control input and adapted to modulate the instantaneous amplitude of the voltage or current supplied to said lamp load under the active control of said control input, said semiconductor power controlling means further having an inherent minimum duration required for a transition between one and the other of its substantially conductive and substantially non-conductive power conditions in response to a stepped change between a value at its control input producing the one and a value producing the other of said power conditions; means for triggering responsive to at least a first input condition corresponding to a desired average power to be supplied to said lamp load and further responsive to the zero-crossing of said alternating current waveforms, said means for triggering having at least one output, and producing at least one change in condition at said output substantially corresponding to the phase angle of said alternating current waveform of said half-cycle at which said semiconductor power controlling means must change from one of said power conditions to the other of said power conditions to supply said desired average power to said lamp load; means for transition control responsive to said output of said means for triggering and having an output coupled to said control input of said power controlling means, for controlling the duration of the change between said value at said control input of said power controlling means producing the one and said value producing the other of said power conditions, such that the power condition of said semiconductor power controlling means is gradually changed between one and the other of said power conditions over a period greater than said inherent minimum duration and less than the remaining portion of said half-cycle, whereby the electro-magnetic interference product of said transition is decreased, and further including means to sense a value corresponding to current; means to detect an overcurrent condition responsive to said means to sense a value corresponding to current; and means to cause a transition to non-conductive for at least the remainder of said half-cycle upon detection of said overcurrent condition, wherein the duration of said transition in response to an overcurrent condition is less than the duration of a transition under normal conditions.

7. Apparatus according to claim 6, wherein the duration of said transition in response to an overcurrent condition is less than the duration of a transition under normal conditions, and greater than said inherent minimum duration.

8. Electronic dimming apparatus adapted for use in a distributed dimmer system, said distributed dimmer system comprising at least one alternating current supply; a plurality of lamp loads at spaced apart locations; a plurality of dimmer enclosures, said dimmer enclosures adapted to be located at spaced-apart locations in proximity to said lamp loads, each of said dimmer enclosures containing at least one semiconductor power controlling means coupled between a power input and a power output, said power output coupled to at least one of said lamp loads; elongated power conductors coupling said power input of each of a plurality of said dimmer enclosures to said alternating current supply; and means for triggering for variably controlling the average power supplied to said lamp load by adjusting the relative proportion of substantially each half-cycle of the alternating current waveform in which said semiconductor power controlling means is in a substantially conductive versus a substantially non-conductive power condition, said means for triggering responsive to at least a first input condition corresponding to a desired average power to be supplied to said lamp load and further responsive to the zero-crossing of said alternating current waveform, said means for triggering having at least one output, and producing at least one change in condition at said output substantially corresponding to the phase angle of said alternating current waveform of said half-cycle at which said semiconductor power controlling means must change from one of said power conditions to the other of said power conditions to supply said desired average power to said lamp load, wherein said semiconductor power controlling means has a control input and is adapted to modulate the instantaneous amplitude of the voltage or current supplied to said lamp load under the active control of said Control input, said semiconductor power controlling means further having an inherent minimum duration required for a transition between one and the other of its substantially conductive and substantially non-conductive power conditions in response to a stepped change between a value at its control input producing the one and a value producing the other of said power conditions; and wherein means is provided for transition control, said means for transition control responsive to said output of said means for triggering and having an output coupled to said control input of said power controlling mean, for controlling the duration of the change between said value at said control input of said power controlling means producing the one and said value producing the other of said power conditions, such that the power condition of said semiconductor power controlling means is gradually changed between one and the other of said power conditions over a period greater than said inherent minimum duration and less than the remaining portion of said half-cycle, whereby the electro-magnetic interference product of said transition is decreased.

9. Apparatus according to claim 8, wherein the voltage across said lamp load during said transition is controlled to maintain a substantially stable rate of voltage change despite variations in the impedance of said lamp load.

10. Apparatus according to claim 9, including means to sense a value corresponding to instantaneous voltage across said lamp load, an output of said means to sense used as a corrective input to said means for transition control to maintain said substantially stable rate of voltage change.

11. Apparatus according to claim 10, wherein during any half-cycle in which at least one of said transitions will occur, said semiconductor power controlling means is in a substantially non-conductive power condition immediately after the zero-crossing and said transition will be from the substantially non-conductive to substantially conductive power conditions.

12. Apparatus according to claim 10, wherein said semiconductor power controlling means modulates the instantaneous amplitude of current supplied to said lamp load, and wherein the rate of change of the value at said control input of said power controlling means is varied, whereby the rate of change of instantaneous current is varied during said transition to maintain said substantially stable rate of voltage change.

13. Apparatus according to claim 11, wherein said semiconductor power controlling means modulates the instantaneous amplitude of current supplied to said lamp load, and wherein the rate of change of the value at said control input of said power controlling means is varied, whereby the rate of change of instantaneous current is varied during said transition to maintain said substantially stable rate of voltage change.

14. Apparatus according to any one of claims 8, 9, 10, 11, or 12, and further including means to non-destructively limit peak current to a value greater than the maximum current required for the normal operation of said lamp load, and less than the value which may cause destruction of said semiconductor power controlling means.

15. Apparatus according to claim 14, wherein said semiconductor power controlling means has a relationship between control input voltage and output current, and wherein said means to non-destructively limit peak current clamps the maximum voltage at said control input at a value within the safe operating region of said control input.

16. Apparatus according to any one of claims 8, 9, 10, 11, or 12, and further including means to sense a value corresponding to current passed by said semiconductor power controlling means; means to detect an overcurrent condition responsive to said means to sense a value corresponding to current; and means to cause a transition to non-conduction for at least the remainder of said half-cycle upon detection of said overcurrent condition, wherein the duration of said transition to non-conduction in response to an overcurrent condition is less than the duration of a transition under normal conditions.

17. Apparatus according to claim 16, wherein the duration of said transition in response to an overcurrent condition is less than the duration of a transition under normal conditions, and greater than said inherent minimum duration.

18. Apparatus according to any one of claims 8, 9, 10, 11, or 12, wherein said lamp load is contained within a housing, and wherein said dimmer enclosure is adapted for mechanical connection to said housing.

19. Apparatus according to claim 18, wherein said housing includes a yoke defining an interior volume contained within its profile, and said dimmer enclosure is adapted to be located substantially within said interior volume defined by said yoke.

20. Apparatus according to claim 18, wherein said housing is provided with a means for attaching said housing to an elongated structural support, and said dimmer enclosure is adapted to be integral with said means for attaching.

21. Apparatus according to any one of claims 8, 9, 10, 11, or 12, wherein said elongated conductors are contained within an elongated rigid raceway enclosure, said elongated rigid raceway enclosure having exterior surfaces defining an interior volume.

22. Apparatus according to claim 21, wherein said dimmer enclosure is adapted for mechanical connection to at least one of said exterior surfaces of said raceway enclosure.

23. Apparatus according to claim 21, wherein said raceway enclosure comprises said dimmer enclosure, such that said semiconductor power controlling means are substantially contained within said interior volume of said raceway.

24. Apparatus according to claim 22, wherein said raceway enclosure further comprises means suitable for the support of said housings for said lamp loads.

25. Apparatus according to any one of claims 8, 9, 10, 11, or 12, wherein said enclosure contains a plurality of said semiconductor power controlling means; wherein at least a portion of said elongated power controllers between said alternating current supply are contained within a common flexible cable; and wherein a multipole electrical connector is provided to terminate said flexible cable and a mating multipole electrical inlet connector is provided at said dimmer enclosure to detachably couple said cable to said dimmer enclosure.

26. Apparatus according to claim 25, and wherein one elongated conductor is provided in said flexible cable for each of a plurality of phases of said alternating current supply.

27. Apparatus according to claim 26, said dimmer enclosure further provided with a multipole electrical outlet connector, at least a plurality of said poles of said outlet connector parallelled to said poles of said inlet connector, whereby a plurality of said dimmer enclosures may be interconnected to a common said flexible cable in a serial relationship.

* * * * *

UNITED STATES PATENT AND TRADEMARK OFFICE
CERTIFICATE OF CORRECTION

PATENT NO. : 4,823,069
DATED : Apr. 18, 1989
INVENTOR(S) : Callahan et al

It is certified that error appears in the above-identified patent and that said Letters Patent is hereby corrected as shown below: Title page:

<u>In the Abstract</u>: Line 2, change "distribution" to --distributed--.

Col.1, line 11, change "4,683,161" to --4,633,161--.

Col. 4, line 60, change "pa-id" to --paid--.

Col. 10, line 37, after "and" insert --inputs 520P and 520N--.

Col. 18, line 39, change "an" to --and--.

Col. 25, line 8, change "waveforms" to --waveform--.

Col. 26, line 11, change "Control" to --control--.

Signed and Sealed this

Twenty-sixth Day of December, 1989

Attest:

JEFFREY M. SAMUELS

Attesting Officer      Acting Commissioner of Patents and Trademarks